(12) United States Patent
Kudo et al.

(10) Patent No.: US 7,114,588 B2
(45) Date of Patent: Oct. 3, 2006

(54) VEHICLE BODY FRAME STRUCTURE OF TWO-WHEELER

(75) Inventors: Takashi Kudo, Saitama (JP); Daisuke Nakagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/874,350

(22) Filed: Jun. 24, 2004

(65) Prior Publication Data
US 2005/0029032 A1    Feb. 10, 2005

(30) Foreign Application Priority Data
Jul. 8, 2003   (JP) .............................. 2003-292615
Jul. 29, 2003  (JP) .............................. 2003-282203

(51) Int. Cl.
*B62M 7/00*    (2006.01)

(52) U.S. Cl. ..................................... 180/219

(58) Field of Classification Search ................ 180/219, 180/225; 280/274, 281.1
See application file for complete search history.

(56) References Cited

U.S. PATENT DOCUMENTS

| | | | | |
|---|---|---|---|---|
| 4,226,296 A | * | 10/1980 | Higaki ....................... | 180/219 |
| RE31,724 E | * | 11/1984 | Isaka ......................... | 180/219 |
| 4,678,054 A | * | 7/1987 | Honda et al. .............. | 180/225 |
| 4,881,614 A | * | 11/1989 | Hoshi et al. ............... | 180/225 |
| 5,653,303 A | * | 8/1997 | Kawamoto .................. | 180/219 |
| 5,823,286 A | * | 10/1998 | Ishihara et al. ............ | 180/309 |
| 5,845,728 A | * | 12/1998 | Itoh et al. .................. | 180/219 |
| 6,502,658 B1 | * | 1/2003 | Nagashii .................... | 180/219 |

FOREIGN PATENT DOCUMENTS

| | | |
|---|---|---|
| JP | 3194288 B2 | 7/2001 |
| JP | 3370888 B2 | 1/2003 |

* cited by examiner

*Primary Examiner*—Tony Winner
(74) *Attorney, Agent, or Firm*—Birch, Stewart, Kolasch & Birch, LLP

(57) ABSTRACT

A vehicle body frame structure for a two-wheeler provides a sufficient distance between exhaust pipes and a front wheel, to facilitate the arrangement of a heat-discharging member such as a radiator or an oil cooler, or other auxiliary components, to increase heat-discharging property by increasing the capacity of the heat-discharging member, and improving flexibility in design such as the shape or the layout of the vehicle body frame and the exhaust pipes. In a two-wheel vehicle having an engine mounted to a vehicle body frame, the engine having exhaust pipes extending forwardly and downwardly and a pair of left and right down tubes extending substantially downwardly from a head pipe provided at the front end of the vehicle body frame, the vehicle body frame includes a first cross member for connecting the left and right down tubes, and the first cross member is formed with arcuate recesses for allowing part of the exhaust pipes to pass therethrough.

19 Claims, 28 Drawing Sheets

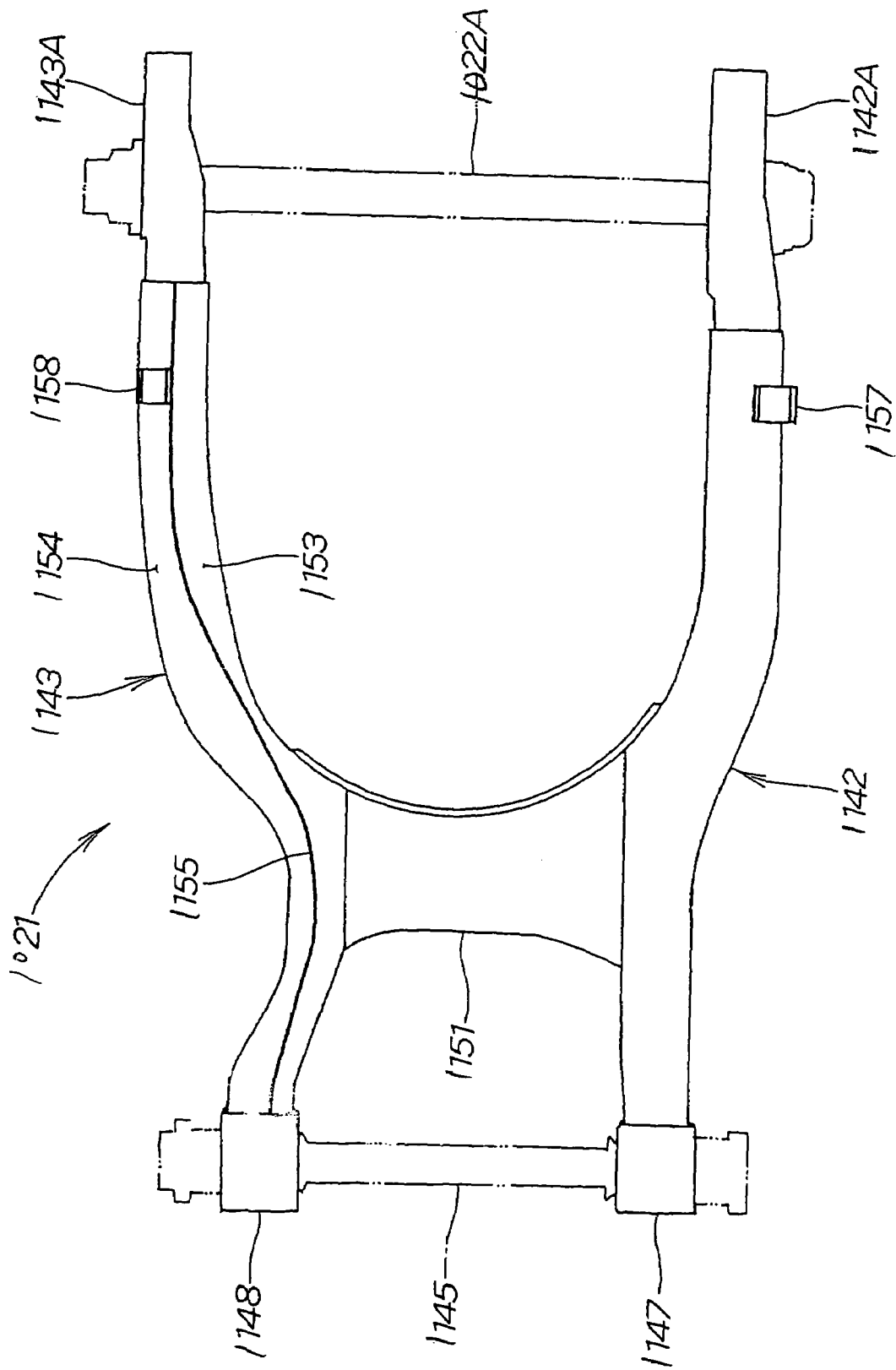

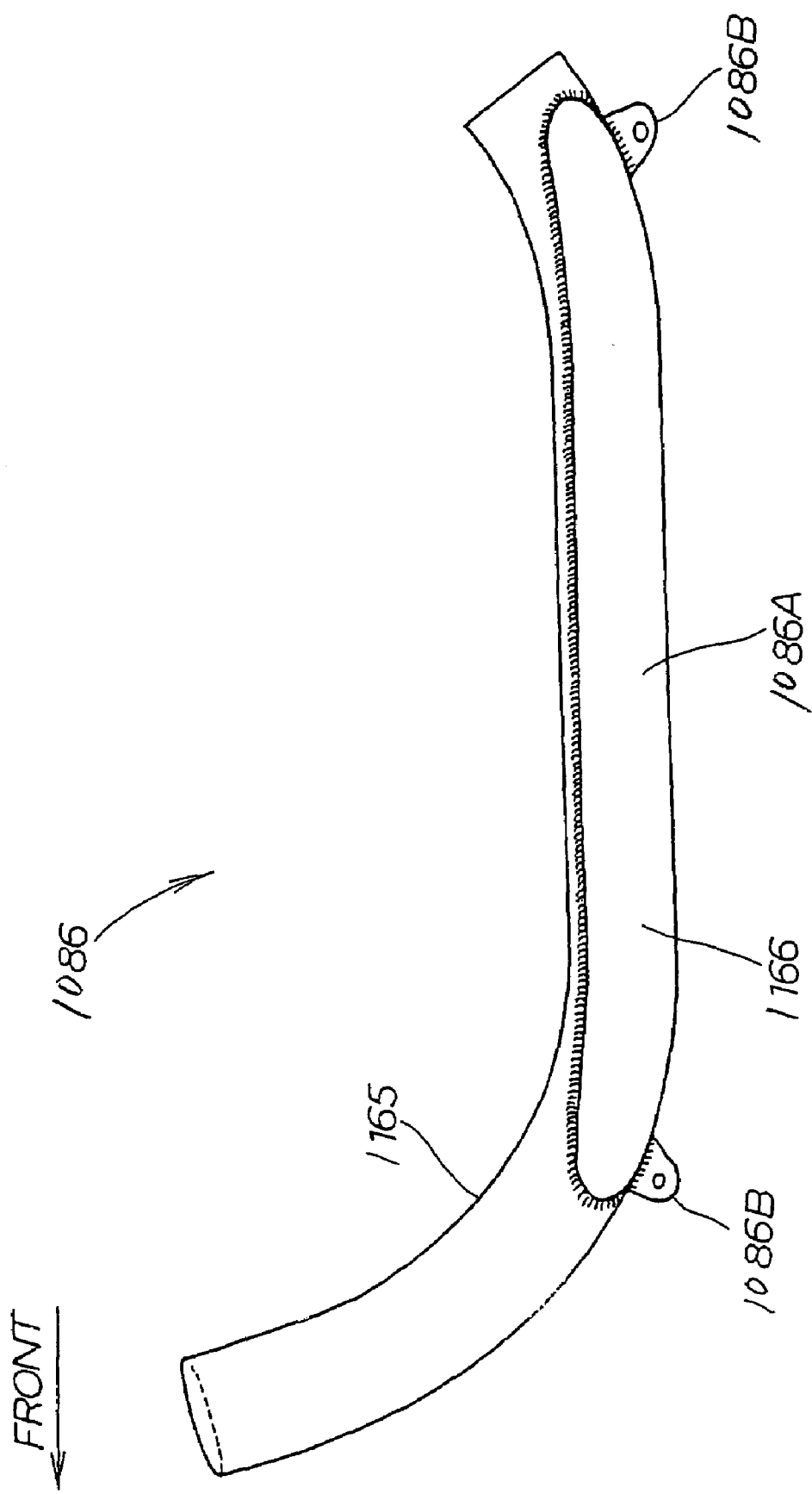

VEHICLE BODY FRAME STRUCTURE OF TWO-WHEELER

CROSS-REFERENCE TO RELATED APPLICATIONS

The present application claims priority under 35 USC 119 to Japanese Patent Application Nos. 2003-292615 and 2003-282203 filed on Jul. 8, 2003 and Jul. 29, 2003, respectively, the entire contents thereof is hereby incorporated by reference.

BACKGROUND OF THE INVENTION

1. Field of the Invention

The present invention relates to a vehicle body frame structure for a two-wheeler.

2. Description of Background Art

In the related art, a vehicle body frame structure for a two-wheeler is known wherein an exhaust pipe, provided at the front of an engine, is located in the vicinity of the vehicle body frame. See, for example, Japanese Patent No. 3,370,888.

Referring now to FIG. 15 attached hereto which corresponds to FIG. 1 in Japanese Patent No. 3,370,888 the following description is provided. Note, that the latter half of the drawing is omitted, and the components are renumbered.

FIG. 15 is a side view of a vehicle body frame structure for a two-wheeler in the related art, showing a pair of left and right down pipes 302, 302 (only the reference numeral 302 designating the nearer one is shown in the drawing) extending substantially downwardly from the head pipe 301 and provided at the front end of the vehicle body frame. A plurality of exhaust pipes 304 extend downwardly from the front of an internal combustion engine 303 so as to curve therefrom. A front wheel 306 is mounted to the head pipe 301 via a front fork 307.

The above-described down pipe 302 requires a great rigidity for supporting the weight of the internal combustion engine 303 and suppressing vibrations of the internal combustion engine 303. Thus, a structure of connecting the left and right down pipes 302, 302 with a cross pipe is employed. When the left and right down pipes 302, 302 are connected with the cross pipe, it is necessary to pay attention to interference between the cross pipe and the exhaust pipes 304. When an attempt is made to secure a clearance between the cross pipe and the exhaust pipes 304 disposed in front of the cross pipe, the distance between the exhaust pipes 304 and the front wheel 306 is reduced.

In addition, for example, it is difficult to dispose a heat-discharging member such as a radiator, an oil cooler, or other auxiliary components between the front wheel 306 and the exhaust pipes 304. More specifically, a large sized auxiliary component cannot be disposed therebetween. In particular, in the case of the internal combustion engine 303 having an in-line four-cylinder engine and thus requiring a large lateral width, since the distance between the left and right down pipes 302, 302 increases, a greater rigidity is required. However, since it is also necessary to take the interference with the plurality of exhaust pipes 304 into consideration, the vehicle body frame and the exhaust pipes 304 are further restrained in flexibility in design relating to their shapes and locations.

A vehicle body frame structure for a two-wheeler employing pipe members is known. For example, see Japanese Patent No. 3194288 (P. 2–3, FIG. 1)

Referring to FIG. 28 shown below which corresponds to FIG. 1 of Japanese Patent No. 3194288 will be described. The components are renumbered.

FIG. 28 is a perspective view showing a vehicle body frame structure for a two-wheel vehicle in the related art, showing that a vehicle body frame 1300 includes a pair of left and right top tubes 1302, 1302 extending rearward from a head pipe 1301 and curving downward, and a pair of left and right down tubes 1304, 1304 extend downwardly from the head pipe 1301 and curve rearward.

The down tubes 1304 are formed of a round pipe member.

In a two-wheeler, one of the portions which limits an angle of inclination of the vehicle body, that is, a bank angle, is the above-described down tubes 1304 which are located at the lower portion of the vehicle body.

Therefore, for example, the positions of the down tubes 1304, 1304 may be moved upwardly or inwardly as a considerable countermeasure. However, since there is an engine inside the vehicle body frame 1300, the above-described movement is difficult. Though it is also possible to eliminate the down tubes 1304, the strength of the vehicle body frame will decrease.

SUMMARY AND OBJECTS OF THE INVENTION

Accordingly, it is an object of the present invention to secure a sufficient distance between exhaust pipes and a front wheel, to facilitate the disposition of the heat-discharging member, such as a radiator or an oil cooler, or other auxiliary components, to increase the capacity of the heat-discharging member to improve its heat-discharging effect, and to increase flexibility in design such as the shapes or the layout of the vehicle body frame and the exhaust pipes in a vehicle body frame structure of a two-wheeler.

The present invention provides a two-wheeler including an engine mounted to a vehicle body frame, the engine having exhaust pipes extending frontward and downward, and a pair of left and right down tubes extending substantially downwardly from a head pipe provided at the front end of the vehicle body frame. The vehicle body frame is provided with a cross member for connecting the left and right down tubes, and the cross member is formed with recesses for allowing part of the exhaust pipes to pass therethrough.

The present invention provides an engine that is an in-line four-cylinder engine and the axes of the respective cylinders are oriented toward above the head pipe when viewed in a side view.

The present invention provides a heat-discharging member such as a radiator or an oil cooler that is disposed in front of the exhaust pipes, and the lower end of the heat-discharging member is disposed at the substantially same position as the cross member or downwardly of the cross member.

The present invention provides recesses that are formed on the front side of the cross member.

The present invention provides recesses that are formed corresponding to the respective exhaust pipes provided on two of the cylinders, which are located on the central side of each cylinder.

The present invention provides a heat-discharging member that is formed into a substantially arcuate shape so as to project rearwardly of a vehicle, and the recesses are formed corresponding to the exhaust pipes of the cylinders located in the vicinity of the apex of the arcuate portion.

The present invention provides a cross member that is a member having an engine hanger for supporting the engine.

The present invention provides a cross member that is disposed downwardly of a straight line passing through an axle of the front wheel, which is supported by a front fork steerably mounted to the head pipe and intersecting the down tubes.

In the present invention, since the recesses are formed on the cross member for allowing part of the exhaust pipes to pass therethrough, the exhaust pipes can be disposed close to the cross member within the recesses, and hence the exhaust pipes can be disposed further rearwardly on the vehicle. Therefore, since a sufficient distance between the exhaust pipes and the front wheel can be secured, and a large space is defined in front of the exhaust pipes, a large sized auxiliary component can be disposed in this space and the flexibility in layout may be increased. With the provision of the above-described space, the distance between the cross member and the plurality of exhaust pipes may be secured even with the in-line multi-cylinder engine. Thus, the flexibility in design such as the shapes or the layout of the vehicle body frame and the exhaust pipes may be increased.

In the present invention, when the axes of the respective cylinders of the engine are oriented toward above the head pipe, the respective cylinders are oriented close to the upright position. Therefore, the exhaust pipes are obliged to extend from a further upward portion of the engine frontward and downward. Thus, the exhaust pipes project further forwardly of the vehicle. However, in the present invention, the exhaust pipes of the engine as described above may be disposed further rearward on the vehicle owing to the recesses formed on the cross member.

In the present invention, since a heat-discharging member is disposed in front of the exhaust pipes, the heat-discharging member of larger size can be disposed in a large space defined in front of the exhaust pipes, and the capacity of the heat-discharging member can be increased, so that the heat-discharging property may be improved. In addition, since the lower end of the heat-discharging member is disposed at the substantially same position as the cross member or downwardly thereof, if the position of the cross member is low, the height of the heat-discharging member can be increased, and the capacity of the heat-discharging member can further be increased, so that the heat discharging property can further be improved.

In the present invention, since the recesses are formed on the front side of the cross member, the exhaust pipes can be disposed in front of the cross member. Thus, the exhaust pipes can easily be attached and detached.

In the present invention, since the recesses are formed corresponding to the respective exhaust pipes provided on two of the cylinders, which are located on the central side of each cylinder, the distance between the exhaust pipes of the two cylinders on the central side and the front wheel can be secured sufficiently even though it is the shortest distance. In addition, since the recesses corresponding to the exhaust pipes of other cylinders are not formed on the cross member, the strength and the rigidity of the cross member can be secured.

In the present invention, since the heat-discharging member is formed substantially into an arcuate shape so as to project rearwardly of the vehicle and the recesses are formed corresponding to the exhaust pipes of the cylinders located in the vicinity of the apex of the arcuate portion, a clearance between the heat-discharging member and the exhaust pipes can be secured. More particularly, the thickness of the heat-discharging member can further be increased between the exhaust pipes of the two cylinders on the central side and the front wheel by forming the heat-discharging member into an arcuate shape. On the other hand, when the thickness of the heat-discharging member is the same as in the related art, the distance between the exhaust pipes of the two cylinders on the central side and the front wheel can be reduced. Thus, a shorter wheel base is achieved.

In the present invention, since an engine hanger for supporting the engine is provided on the cross member, the weight of the engine and vibrations of the engine can be effectively received by the cross member.

In the present invention, since the cross member is disposed downwardly of the straight line passing through the axle of the front wheel and intersecting the down tubes, the cross member is disposed downwardly of the position where the distance between the front wheel and the down tubes is minimum. Therefore, a sufficient distance between the front wheel and the cross member can be secured, and the exhaust pipe, the heat-discharging member, and the like can be disposed easily between the front wheel and the cross member.

Accordingly, it is an object of the present invention to secure the bank angle easily by improving the vehicle body frame structure of a two-wheeler.

In order to achieve the above-described object, in a two-wheeler comprising a head pipe, a pair of left and right down tubes extending downwardly and obliquely rearwardly from the head pipe, and a pair of left and right lower pipes extending downwardly and rearwardly from the respective lower ends of the down tubes, a large bank angle is secured by covering the lower portions of an engine and exhaust pipes connected to the engine with an under cowl having left and right inclined planes formed so as to open upwardly, and forming continuous inclined planes on the left and right lower pipes so as to continue from the inclined planes.

The bank angle can be increased in comparison with the related art, and the required bank angle can easily be secured by forming the continuous inclined planes continuing from the inclined planes of the under cowl.

The portion of the engine projecting sideward of the vehicle body is provided with inclined planes extending in substantially the same direction as the inclined planes of the under cowl, and the extensions of the continuous inclined planes of the lower pipes are substantially brought into line with the inclined planes of the engine.

The bank angle can further be increased, and the required bank angle can be secured further easily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 21 is a plan view showing a swing arm of the two-wheeler according to the present invention;

FIG. 24 is a side view of a lower pipe of the two-wheeler according to the present invention;

DETAILED DESCRIPTION OF THE PREFERRED EMBODIMENTS

Figure 1:
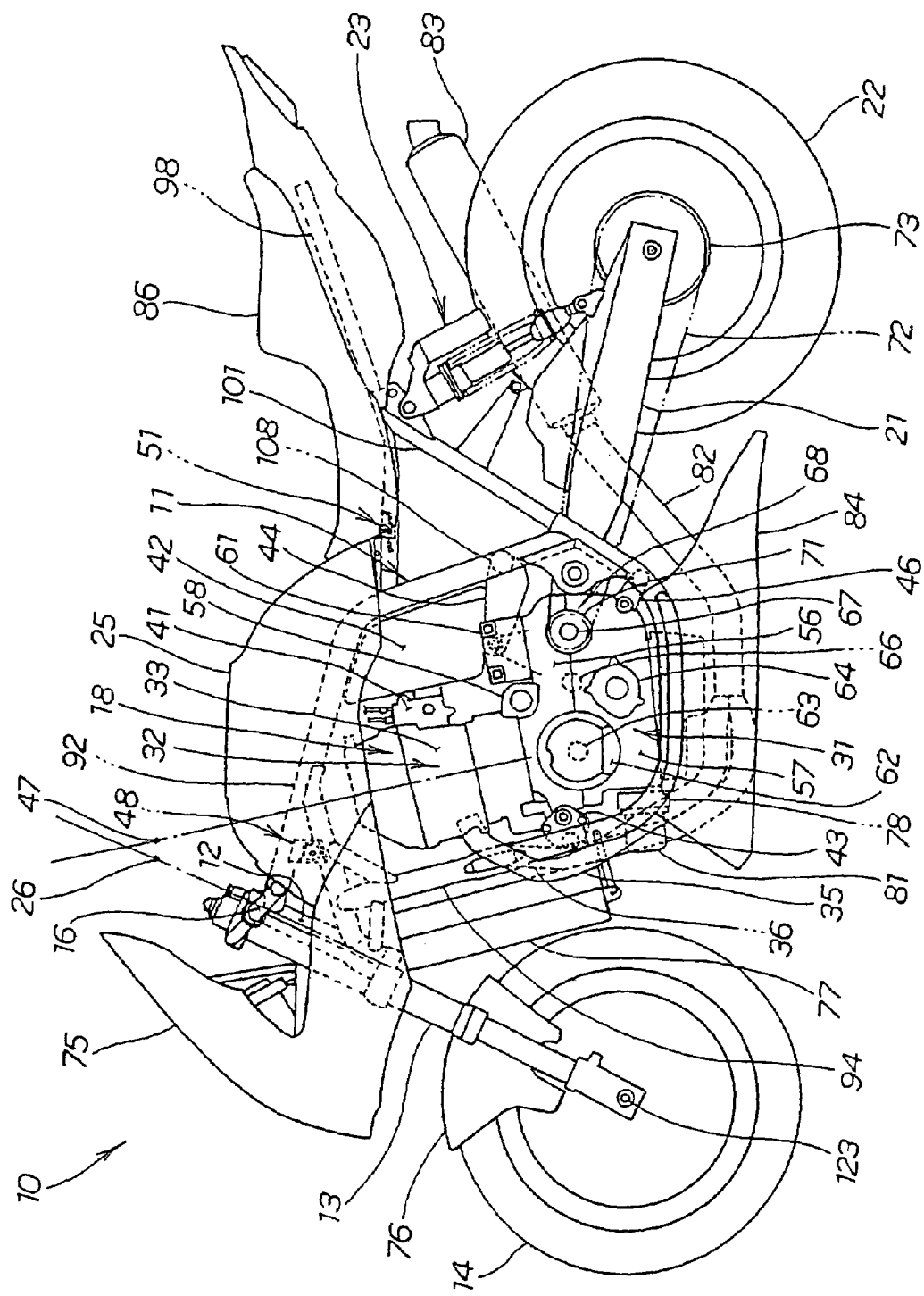
FIG. 1 is a side view of a two-wheeler according to the present invention.

Referring now to the attached drawings, the best mode for carrying out the present invention will be described. The drawings are to be viewed in the orientation in which the reference numerals can be seen in the right way.

FIG. 1 is a side view of a two-wheeler according to the present invention. A motorcycle 10 is a two-wheel vehicle assembled in such a manner that a front fork 13 is steerably attached to a head pipe 12 provided at the front of a vehicle body frame 11 of a cradle-shape with a front wheel 14 attached to the lower end of the front fork 13. A handle 16 is mounted on top of the front fork 13 with an engine 18 mounted to the inner side of the vehicle body frame 11. A swing arm 21 is attached to the rear lower end of the vehicle body frame 11 so as to be capable of swinging in the vertical direction. A rear wheel 22 is mounted to the rear end of the swing arm 21 with a pair of left and right rear cushion units 23, 24 (only the reference numeral 23 on the nearer side is shown) mounted so as to extend between the upper rear portion of the vehicle body frame 11 and the rear portion of the swing arm 21. A fuel tank 25 formed of aluminum alloy is mounted to the upper portion of the vehicle body frame 11. An axis 26 of the head pipe 12 is provided.

The engine 18, is an in-line four-cylinder engine having the respective cylinders arranged widthwise of the vehicle and includes a crankcase 31 and a cylinder unit 32 attached to the front of the crankcase 31 in a substantially vertical direction. The engine 18 is mounted to the vehicle body frame 11 with a front engine hanger 43, a rear upper engine hanger 44, and a rear lower engine hanger 46 with exhaust pipes 35, 36, 37, 38 (only the exhaust pipes 35, 36 are shown in the drawing) extending frontward and downward from the front portion of the cylinder head 33, which constitutes the cylinder unit 32, corresponding to the respective cylinders. A carburetor 41 and an air cleaner 42 are mounted in sequence to the rear portion of the cylinder head 33.

An axis 47 of each cylinder of the engine 18, and the cylinder unit 32 described above is oriented close to the upright position by allowing the axis 47 to intersect with the axis 26 of the head pipe 12. More specifically, orienting the axis 47 toward above the head pipe 12.

The fuel tank 25 is a member mounted to a front mounting member 48 and a rear mounting member 51 provided on the vehicle body frame 11.

An upper case 56 and an lower case 57 constitute the crankcase 31. A cell motor 58 and a battery 61 are mounted to the rear upper portion of the crank case 31. An AC generator 62 cover projects from the crankcase 31 sideward of the vehicle body. A crankshaft 63 and a water pump 64 are mounted to the side surface of the crankcase 31. A counter shaft 66 and an output shaft 67 are attached to a gear changer 68 provided integrally with the rear portion of the engine 18. A drive sprocket 71 is attached to the output shaft 67 and a chain 72 is wound around a driven sprocket 73 and the drive sprocket 71 provided integrally with the rear wheel 22.

An upper cowl 75 is provided for covering the upper front portion of the motorcycle 10 with a front fender 76 for covering the upper portion of the front wheel 14. A radiator 77 is provided for cooling the engine 18 with an oil cooler 78 mounted to the lower front portion of the engine 18. An oil element 81 is mounted to the oil cooler 78. A rear exhaust pipe 82 is connected to the respective exhaust pipes 35–38 with a muffler 83 connected to the rear exhaust pipe 82. An under cowl 84 is provided for covering the lower portion of the engine 18. The exhaust pipes 35–38 and the rear exhaust pipe 82 are provided. A seat 86 is disposed rearwardly of the fuel tank 25.

Figure 2:
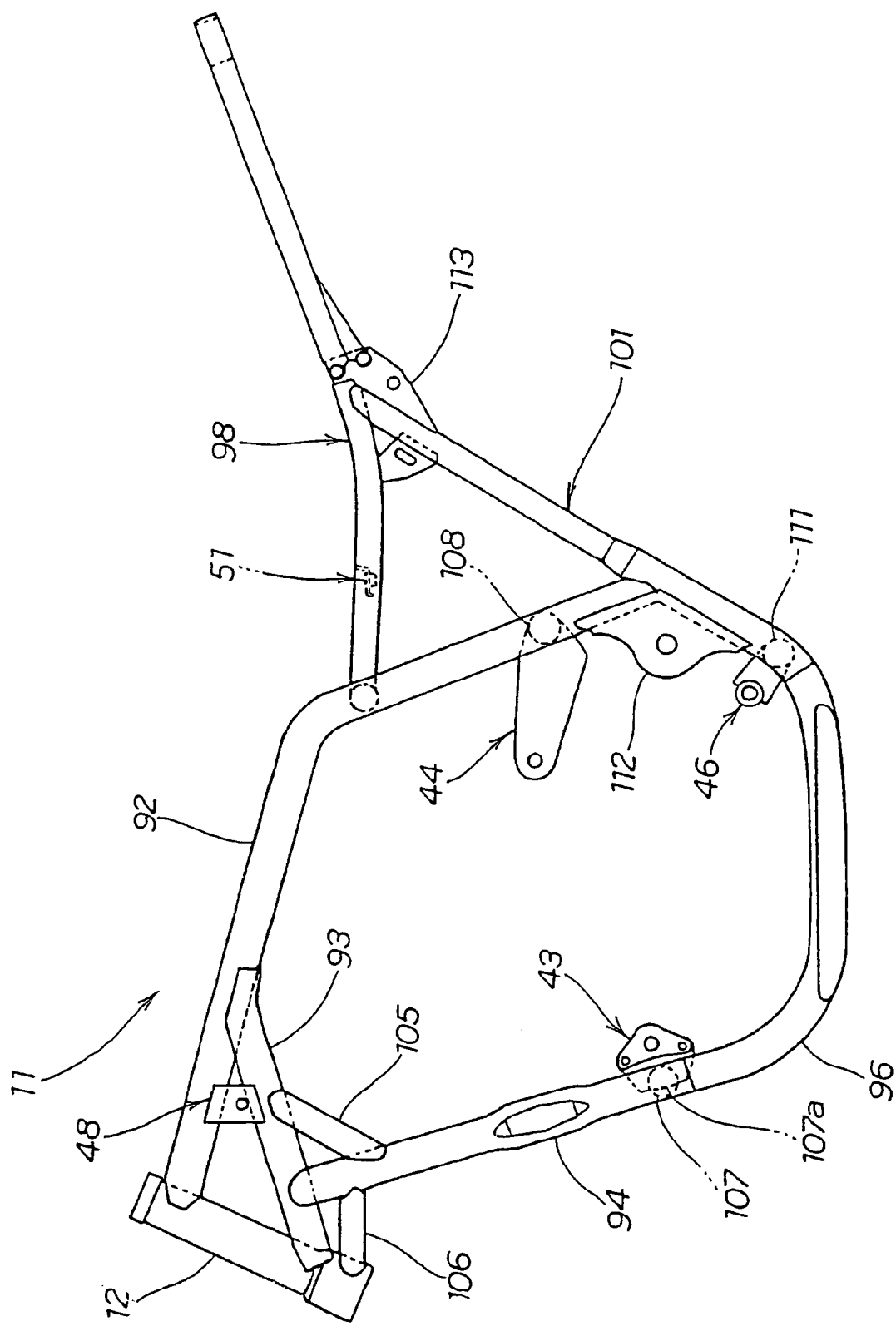
FIG. 2 is a side view showing a vehicle body frame of the two-wheeler according to the present invention.

FIG. 2 is a side view showing the vehicle body frame of the two-wheeler according to the present invention. The vehicle body frame 11 includes the head pipe 12, a pair of left and right main pipes 92, 92 (only the reference numeral 92 on the near side is shown) extending from the head pipe 12 rearward and obliquely downwardly and then further extending rearwardly and obliquely downwardly. Front pipes 93, 93 (only the reference numeral 93 on the near side is shown) extend from the lower portion of the head pipe 12 to the main pipes 92, 92 with a pair of left and right down tubes 94, 94 (only the reference numeral 94 on the near side is shown) extending substantially downwardly from the front pipes 93, 93. Lower pipes 96, 96 (only the reference numeral 96 on the near side is shown) extend from the lower ends of the down tubes 94, 94 so as to curve rearwardly. Seat rails 98, 98 (only the reference numeral 98 on the near side is shown) extend rearwardly from the upper rear portions of the main pipes 92, 92, and sub pipes 101, 101 (only the reference numeral 101 on the near side is shown) are connected to the intermediate portions of the seat rails 98, 98 and the rear ends of the main pipes 92, 92, and are also connected to the lower pipes 96, 96 at the lower ends thereof.

Reinforcing pipes 105, 105 (only the reference numeral 105 on the near side is shown), and 106, 106 (only the reference numeral 106 on the near side is shown) are provided with a first cross pipe 107 extending between the down tubes 94, 94 for attaching the front engine hanger 43. A second cross pipe 108 extends between the main pipes 92, 92 for attaching the rear upper engine hanger 44. A third cross pipe 111 extends between the sub pipes 101, 101 for attaching the rear lower engine hanger 46. Pivot plates 112, 112 (only the reference numeral 112 on the near side is shown) are attached at the joints between the main pipes 92, 92 and the sub pipes 101, 101 for attaching a swing shaft (that is, a pivot shaft) of the swing arm 21 (See FIG. 1). Shock absorbers 113, 113 (only the reference numeral 113 on the near side is shown) are attached to the joints between the seat rails 98, 98 and the sub pipes 101, 101 for attaching the respective upper ends of the rear shock absorber units 23, 24 (See FIG. 1).

The front mounting members 48 for mounting the fuel tank 25 to the vehicle body frame 11 are attached to the main pipes 92 and the front pipes 93, and are provided on the left side and the right side of the main pipe 92 and the front pipe 93, respectively.

The rear mounting members 51 for mounting the rear portion of the fuel tank to the vehicle body frame 11 are provided on the inner sides of the seat rails 98, 98, respectively.

Figure 3:
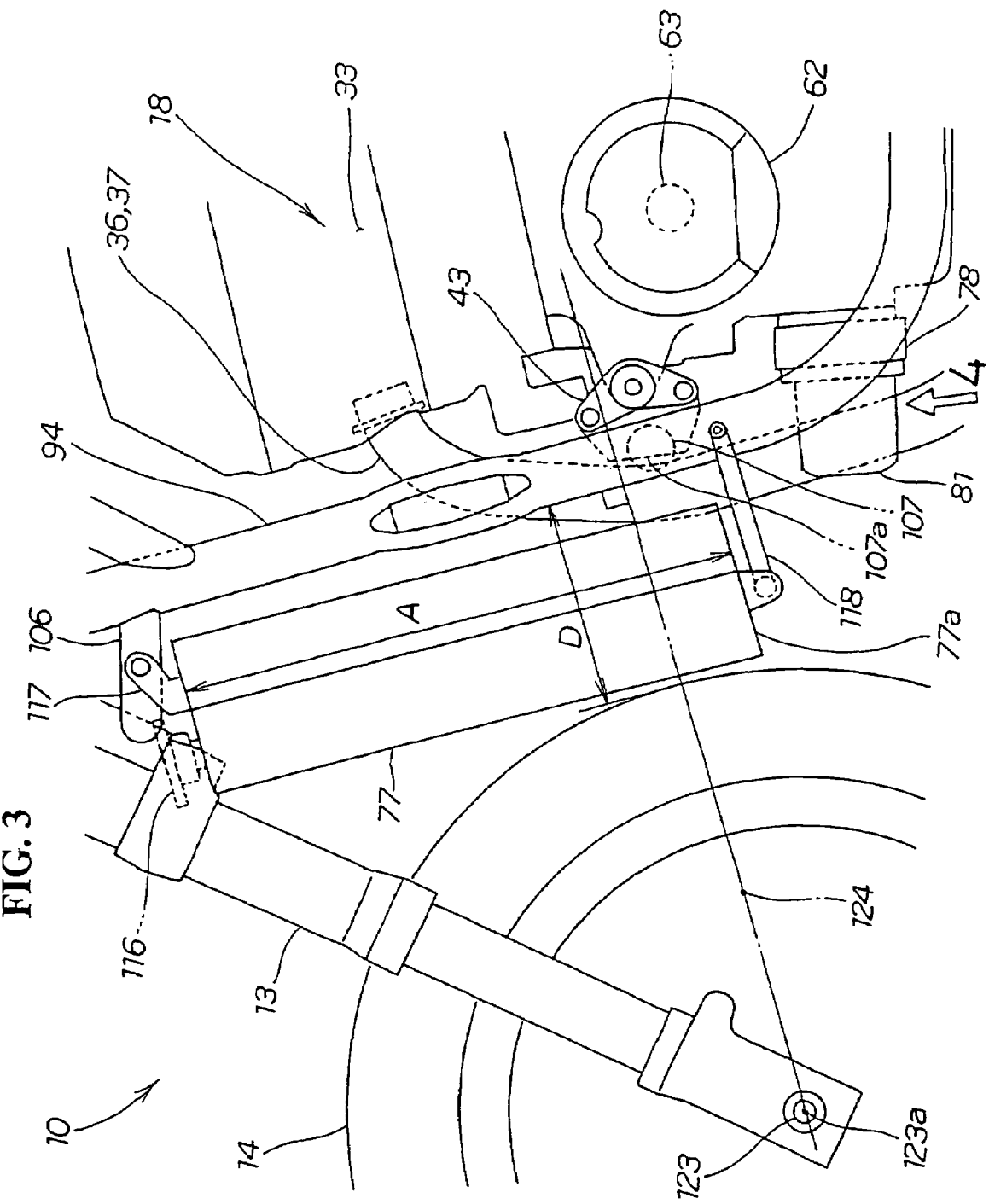
FIG. 3 is a side view showing a front principal portion of the two-wheeler according to the present invention.

FIG. 3 is a side view showing a front principal portion of the two-wheeler according to the present invention, showing that arcuate recesses 107a, 107a (only the reference numeral 107a on the near side is shown) formed on the front side of the first cross pipe 107 extending between the down tubes 94, 94 (only the reference numeral 94 on the near side is shown) for supporting the front engine hanger 43. Parts of the exhaust pipes 36, 37 (only the exhaust pipes 36, 37 connected to the two cylinders on the inner side out of the four cylinders of the engine 18 are shown here) extend from the front of the engine 18 so as to curve downwardly and pass through the arcuate recesses 107a, 107a. The radiator 77 is disposed in front of the exhaust pipes 35–38 (the exhaust pipes 35, 38 are not shown). A radiator cap 116 and an upper mounting stay 117 are provided for mounting the upper portion of the radiator 77 to the reinforcing pipe 106. A lower mounting stay 118 is provided for mounting the lower portion of the radiator 77 to the down tubes 94.

Figure 4:
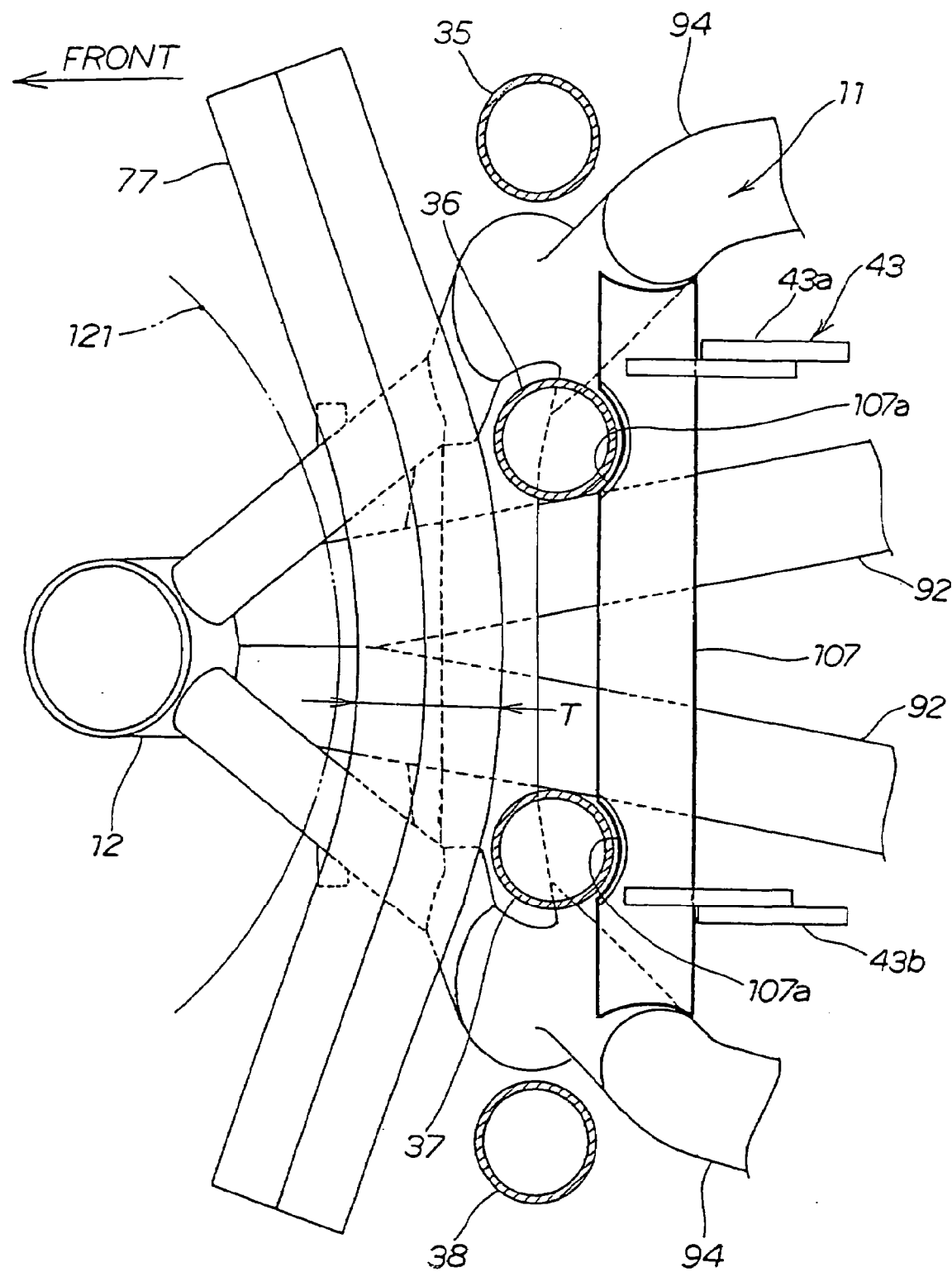
FIG. 4 is a drawing viewed in the direction indicated by an arrow 4 in FIG. 3.

FIG. 4 is a drawing viewed in the direction indicated by an arrow 4 in FIG. 3. The exhaust pipes 35–38 are shown in cross-section. An arrow (FRONT) in the drawing indicates the front of the vehicle, hereinafter.

The first cross pipe 107 constituting the vehicle body frame 11 is a member formed with the arcuate recesses 107a, 107a on the left and right on the front side thereof, the exhaust pipes 36, 37 are placed in these arcuate recesses 107a, 107a in the vicinity thereto, and the radiator 77 of the substantially arcuate shape projecting rearwardly of the vehicle at the center is disposed in the vicinity of the exhaust pipes 36, 37. A left hanger 43a and a right hanger 43b constitute the front engine hanger 43, and each of them includes two members.

As described above, the reason why the arcuate recesses 107a, 107a are formed on the first cross pipe 107, parts of the exhaust pipes 36, 37 being disposed in the arcuate recesses 107a, 107a to shift the exhaust pipes 36, 37 rearwardly and the radiator 77 is also shifted rearwardly so as to be closer to the exhaust pipes 36, 37 to improve the heat-discharging effect by increasing the capacity of the radiator 77 by maximizing the thickness T of the radiator 77 in a space between a trajectory 121 (the trajectory when the front wheel 14 is stroked toward the handle 16 (See FIG. 1) as much as possible, thus taking the position closest to the radiator 77) of the outer periphery of the front wheel 14 (See FIG. 3) shown by an imaginary line in the drawing and the first cross pipe 107. In the present invention, the lower end 77a of the radiator 77 is disposed at substantially the same position as the first cross member 107 or downwardly thereof, so that the height A of the radiator 77 is increased to increase the capacity of the radiator 77.

In particular, in the case of a two-wheeler designed for racing in which the engine 18 (See FIG. 3) is operated continuously at high-revolutions, since the cooling capability of the radiator 77 affects significantly on the output and durability of the engine 18, the provision of a radiator 77 being of a large size and having a large capacity is essential.

Referring back to FIG. 3, when a line passing through an axle 123 of the front wheel 14, more specifically, a center point 123a which is the center of the axle 123 and intersecting the down tubes 94 is represented by reference numeral 124, the first cross pipe 107 is provided downwardly of the straight line 124. The positional relationship between the straight line 124 and the first cross pipe 107 is, so-called, "1G state", in which only the operator is seated on the motorcycle 10.

The distance D between the front wheel 14 and the down tube 94 is the shortest on the straight line 124. In this manner, the first cross member 107 can be disposed apart from the position where the distance D between the front wheel 14 and the down tube 94 is smallest by disposing the first cross member 107 downwardly of the straight line 124 with a sufficient distance between the front wheel 14 and the exhaust pipes 36, 37 being easily secured. For example, when the first cross member 107 is disposed upwardly of the straight line 124, the distance D becomes shorter when the front wheel 14 is stroked toward the handle 16.

As described in FIG. 1, FIG. 3, and FIG. 4, firstly, the present invention includes the motorcycle 10 having the engine 18 mounted to the vehicle body frame 11, the engine 18 having the exhaust pipes 35–38 extending frontwardly and downwardly, and the pair of left and right down tubes 94 extending substantially downwardly from the head pipe 12 provided at the front end of the vehicle body fame 11. The vehicle body frame 11 is provided with the first cross member 107 for connecting the left and right down tubes 94, and the first cross member 107 is formed with the arcuate recesses 107a for allowing part of the exhaust pipes 36, 37 to pass therethrough.

Since the arcuate recesses 107a are formed on the first cross member 107 for allowing part of the exhaust pipes 36, 37 to pass therethrough, the exhaust pipes 36, 37 can be disposed close to the first cross member 107 within the arcuate recesses 107a. Thus, the exhaust pipes 36, 37 can be disposed further rearwardly on the vehicle. Therefore, since a sufficient distance between the exhaust pipes 36, 37 and the front wheel 14 can be secured, and a large space is defined in front of the exhaust pipes 36, 37, the large sized auxiliary component, such as the radiator 77, can be disposed in this space, and flexibility in layout may be increased.

Secondly, the present invention includes an engine 18 that is an in-line four-cylinder engine and the axes 47 of the respective cylinders is oriented toward above the head pipe 12 as viewed in a side view.

When the axes 47 of the respective cylinders of the engine 18 are oriented toward above the head pipe 12, the respective cylinders are oriented close to the upright position. Therefore, the exhaust pipes 35–38 are obliged to extend from a further upward portion of the engine 18 forwardly and downwardly. Thus, the exhaust pipes 35–38 project further forwardly of the vehicle. However, in the present invention, the exhaust pipes 36, 37 of the engine 18 as described above may be disposed further rearwardly on the vehicle owing to the arcuate recesses 107a formed on the first cross member 107.

Thirdly, the present invention includes the heat-discharging member, such as the radiator 77 or the oil cooler, that is disposed in front of the exhaust pipes 35–38, and the lower end of the heat-discharging member is disposed at substantially the same position as the first cross member 107 or downwardly of the first cross member 107.

Since the heat-discharging member is disposed in front of the exhaust pipes 35–38, the heat-discharging member of a larger size can be disposed in a large space defined in front of the exhaust pipes 35–38, and the capacity of the heat-discharging member can be increased, so that the heat-discharging property may be improved. In addition, since the lower end 77a of the heat-discharging member is disposed at substantially the same position as the first cross member 107 or downwardly thereof, if the position of the first cross member 107 is low, the height A of the heat-discharging member can be increased, and the capacity of the heat-discharging member can further be increased, so that the heat discharging property can further be improved.

Fourthly, the present invention includes arcuate recesses 107a that are formed on the front side of the first cross member 107.

Since the arcuate recesses 107a are formed on the front side of the first cross member 107, the exhaust pipes 36, 37 can be disposed in front of the first cross member 107, and hence the exhaust pipes 36, 37 can easily be attached to and detached from the cylinder head 33.

Fifthly, the present invention includes arcuate recesses 107a that are formed corresponding to the respective exhaust pipes 36, 37 provided on two of the cylinders on the central side of each cylinder.

Since the arcuate recesses 107a are formed corresponding to the respective exhaust pipes 36, 37 provided on two of cylinders on the central side of each cylinder, the distance between the exhaust pipes 36, 37 of the two cylinders on the central side and the front wheel 14 can be secured sufficiently even though it is the shortest. In addition, since the recesses corresponding to the exhaust pipes 35, 38 of other cylinders are not formed on the first cross member 107, the strength and the rigidity of the first cross member 107 can be secured.

Sixthly, the present invention includes the radiator 77 as the heat-discharging member that is formed into a substantially arcuate shape so as to project rearwardly of a vehicle with the arcuate recesses 107a being formed corresponding to the exhaust pipes 36, 37 of the cylinders located in the vicinity of the apex of the arcuate portion.

Since the heat-discharging member is formed substantially into an arcuate shape so as to project rearwardly of the vehicle and the arcuate recesses 107a are formed corresponding to the exhaust pipes 36, 37 of the cylinders located in the vicinity of the apex of the arcuate portion, a clearance between the heat-discharging member and the exhaust pipes 36, 37 can be secured. More particularly, the thickness T of the heat-discharging member can further be increased between the exhaust pipes 36, 37 of the two cylinders on the central side and the front wheel 14 by forming the heat-discharging member into an arcuate shape. On the other hand, when the thickness T of the heat-discharging member is the same as in the related art, the distance between the exhaust pipes 36, 37 of the two cylinders on the central side and the front wheel 14 can be reduced, and hence a shorter wheel base is achieved.

Seventhly, the present invention includes a first cross member 107 that is a member having the front engine hanger 43 for supporting the engine 18.

Since the front engine hanger 43 for supporting the engine 18 is provided on the first cross member 107, the weight of the engine 18 and the vibrations of the engine 18 can be effectively received by the first cross member 107.

Eighthly, the present invention includes the first cross member 107 that is disposed downwardly of the straight line 124 passing the axle 123 of the front wheel 14, which is supported by the front fork 13 steerably mounted to the head pipe 12 and intersecting the down tubes 94.

Since the first cross member 107 is disposed downwardly of the straight line 124 passing through the axle 123 of the front wheel 14 and intersecting the down tubes 94, the first cross member 107 is disposed downwardly of the position where the distance between the front wheel 14 and the down tubes 94 is minimum. Therefore, a sufficient distance between the front wheel 14 and the first cross member 107 can be secured, and the exhaust pipe 36, 37, the heat-discharging member, and the like can be disposed easily between the front wheel 14 and the first cross member 107.

Figure 5:
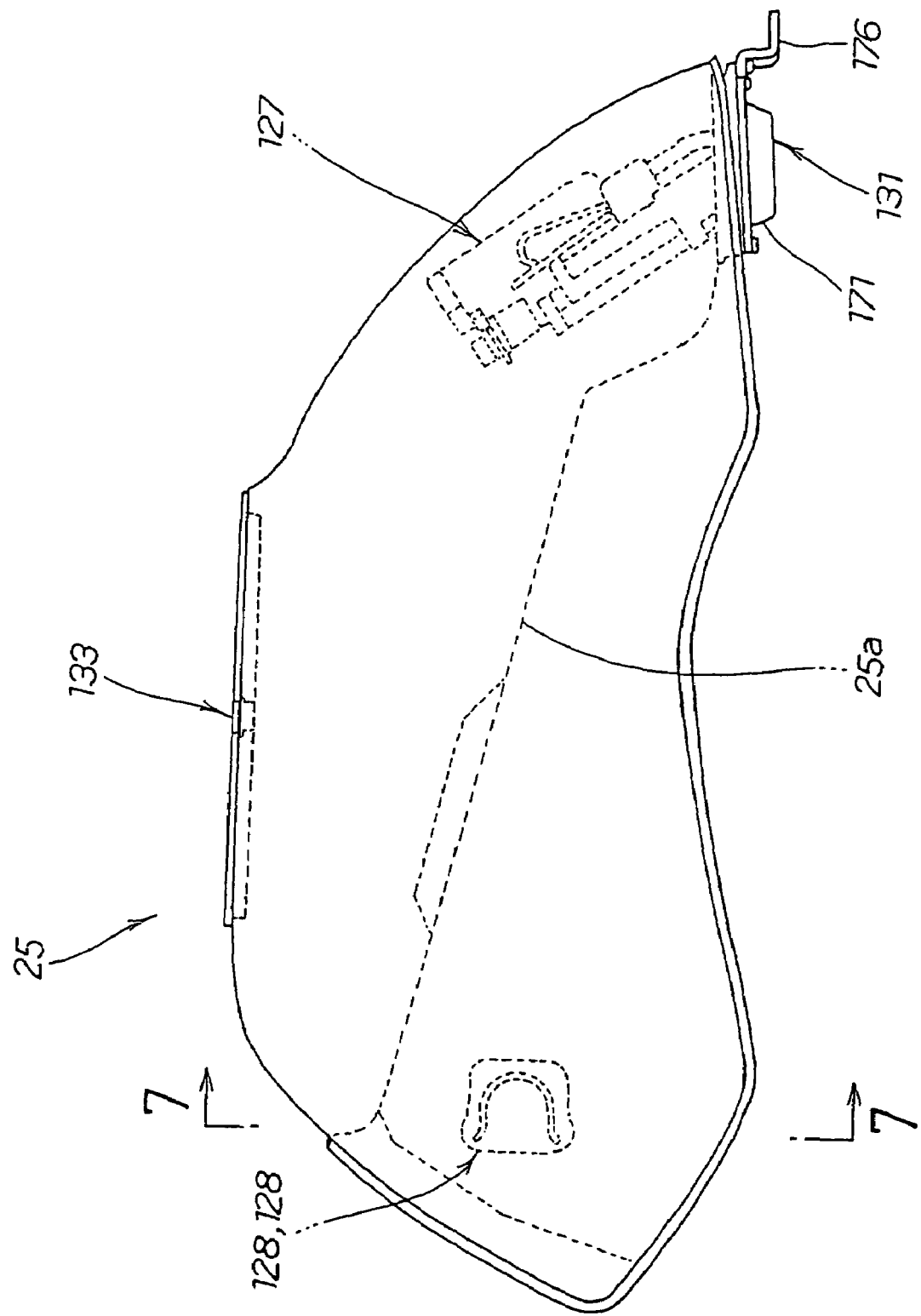
FIG. 5 is a side view of a fuel tank of the two-wheeler according to the present invention.

FIG. 5 is a side view of the fuel tank of the two-wheeler according to the present invention. The fuel tank 25 includes a fuel pump 127 attached at the rear of a bottom wall 25a so as to be disposed in the interior of the fuel tank 25, a pair of left and right engaging members 128, 128 provided inside of the front portion thereof so as to be engaged with the front mounting member 48 (See FIG. 2) on the vehicle body frame 11 (See FIG. 2), and a rear-tank mounting portion 131 provided at the bottom on the rear portion thereof so as to be mounted to rear mounting members 51 (See FIG. 2) on the vehicle body frame 11. A fuel port 133 is provided.

Figure 6:
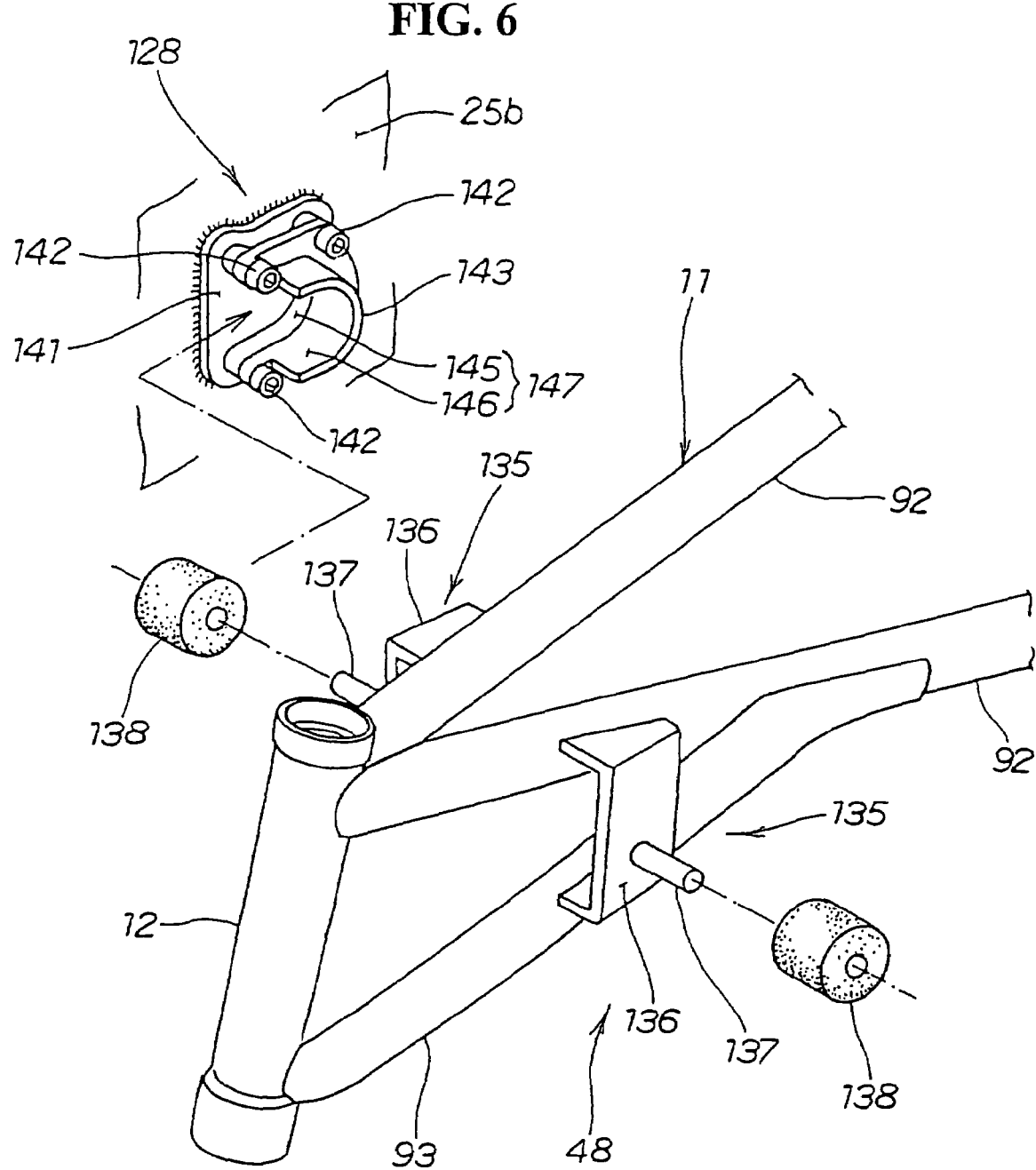
FIG. 6 is a perspective view showing a mounting structure of the front portion of the fuel tank of the two-wheeler according to the present invention.

FIG. 6 is a perspective view showing a mounting structure of the front portion of the fuel tank of the two-wheeler according to the present invention, in which the front mounting member 48 on the vehicle body frame 11 includes left and right mounting potions 135, 135, and the mounting portion 135 includes an angular C-shaped plate 136 attached to the main pipe 92 and the front pipe 93. A supporting pin 137 extends from the angular C-shaped plate 136 sideward of the vehicle with a shock absorbing rubber 138 to be fitted on the supporting pin 137.

The engaging member 128 on the fuel tank 25 (See FIG. 5) is constituted of two members; a base member 141 of aluminum alloy welded to a side wall 25b of the fuel tank 25, and an engaging body 143 mounted to the base member 141 with bolts 142 . . . ( . . . indicates that there are a plurality of members, hereinafter). A first recess 145 is formed on the base member 141. A second recess 146 is formed on the engaging body 143. The first recess 145 and the second recess 146 are portions constituting an engaging recess 147.

Figure 7:
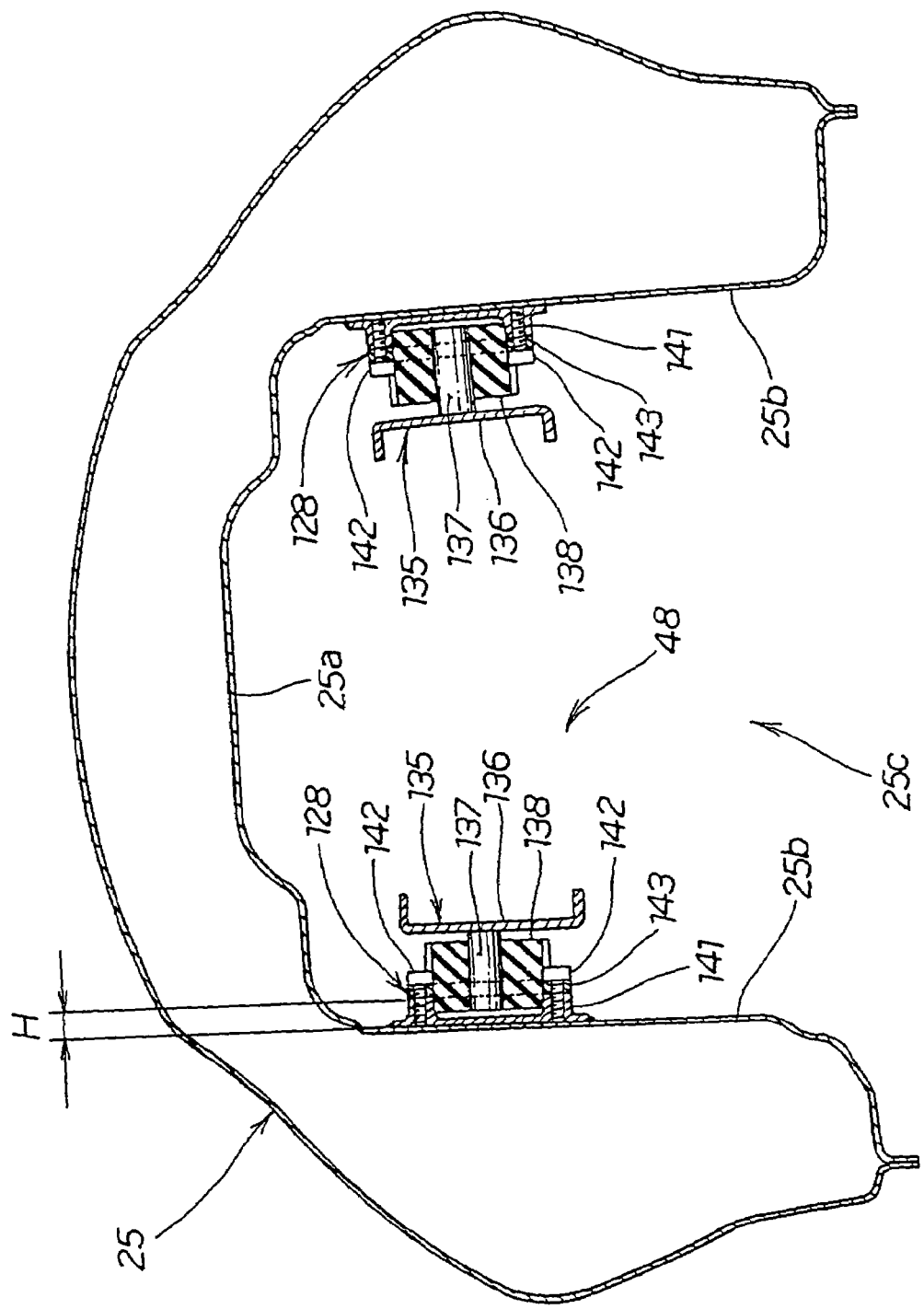
FIG. 7 is a cross-sectional view taken along the line 7—7 in FIG. 5.

FIG. 7 is a cross-sectional view taken along the line 7—7 in FIG. 5, showing that a recessed inner wall 25c including the left and right side walls 25b, 25b, and the bottom wall 25a connecting the upper ends of the side walls 25b, 25b is formed on the inner side of the fuel tank 25, the base member 141 of the engaging member 128 is welded to the side wall 25b, the engaging body 143 is mounted to the base member 141 with the bolts 142 . . . , and the engaging member 128 is engaged with the mounting portion 135 of the front mounting member 48 on the vehicle body frame 11 (See FIG. 2). More specifically, the engaging member 128 is supported by the supporting pin 137 and the angular C-shaped plate 136 via the shock absorbing rubber 138.

Figure 8:
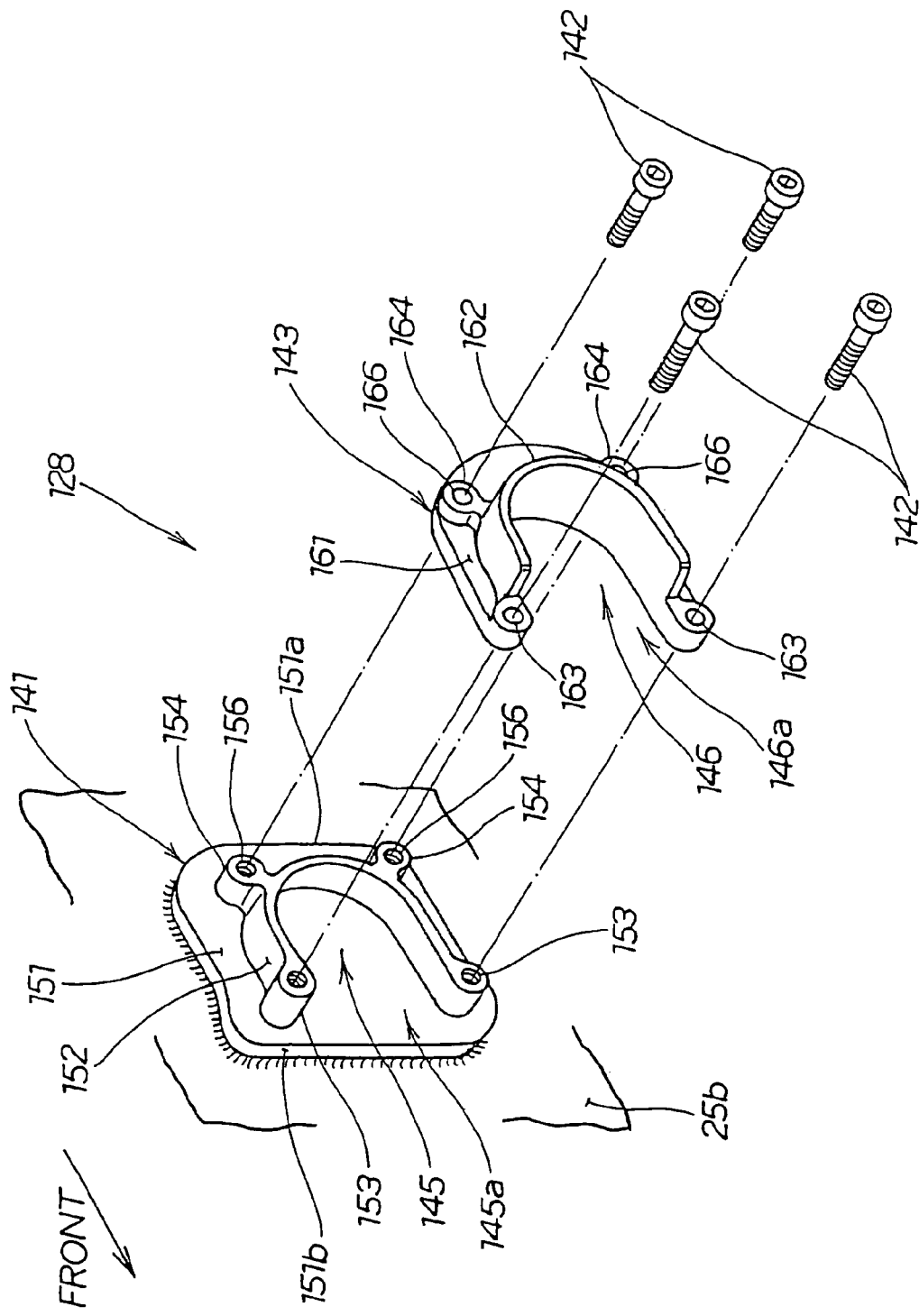
FIG. 8 is an exploded perspective view showing the structure and the assembling procedure of a fuel tank engaging member of the two-wheeler according to the present invention.

FIG. 8 is an exploded perspective view showing the structure and the assembling procedure of the fuel tank engaging member of the two-wheeler according to the present invention.

The base member 141 of the engaging member 128 is a member including a flat portion 151 which is to be welded to the side wall 25b of the fuel tank 25 (See FIG. 7) along the edge thereof, a U-shaped upright wall 152 extends upright from the flat portion 151, first female screws 153, 153 are provided at the respective ends of the U-shaped upright wall 152 with column-shaped portions 154, 154 extending upright from the flat portion 151 and formed integrally with the U-shaped upright wall 152. Second female screws 156, 156 are provided on the column-shaped portions 154, 154, and have the above-described first recess 145 on the inner side of the U-shaped upright wall 152.

The engaging body 143 is a member including a U-shaped flat portion 161, a U-shaped upright wall 162, extending upright from the U-shaped flat portion 161, first bolt insertion holes 163, 163 provided at the respective ends of the U-shaped upright wall 162, column-shaped portions 164, 164 extending upright from the U-shaped flat portion 161 and formed integrally with the U-shaped upright wall 162, and second bolt insertion holes 166, 166 provided in the column shaped portions 164, 164, and being formed with the above-described second recess 146 on the inner side of the U-shaped upright wall 162.

The assembling procedure of the engaging member 128 to the fuel tank 25 will be described in sequence below.

The base member 141 is positioned and provisionally fixed to the side wall 25b of the fuel tank 25 with a welding jig so that an opening 145a of the first recess 145 faces forward, and four sides of the flat portion 151 of the base member 141 are welded to the side wall 25b of the fuel tank continuously. Since a side 151a on the back side of the flat portion 151 is shorter than a side 151b on the front side, the welding operation can be performed easily.

(2) The engaging body 143 is placed so that an opening 146a of the second recess 146 faces forward, and the bolts 142 . . . are inserted into the first bolt insertion holes 163, 163 and the second bolt insertion holes 166, 166 of the engaging member 143 and screwed into the first female screws 153, 153 and the second female screws 156, 156 on the base member 141. Assembly of the engaging member 128 to the fuel tank 25 is then completed.

While the engaging member is integrally formed in the related art, the engaging member 128 is formed of two members of the base member 141 and the engaging body 143 in the present invention. Therefore, when welding the engaging member 128, since the dimension of the base member 141, in particular, the height H (See FIG. 7) is small, the welding operation of the base member 141 within the recessed inner wall 25c (see FIG. 7) can be performed easily, and the welding jig or the welding device can be inserted into the recessed inner wall 25c easily.

Figure 9:
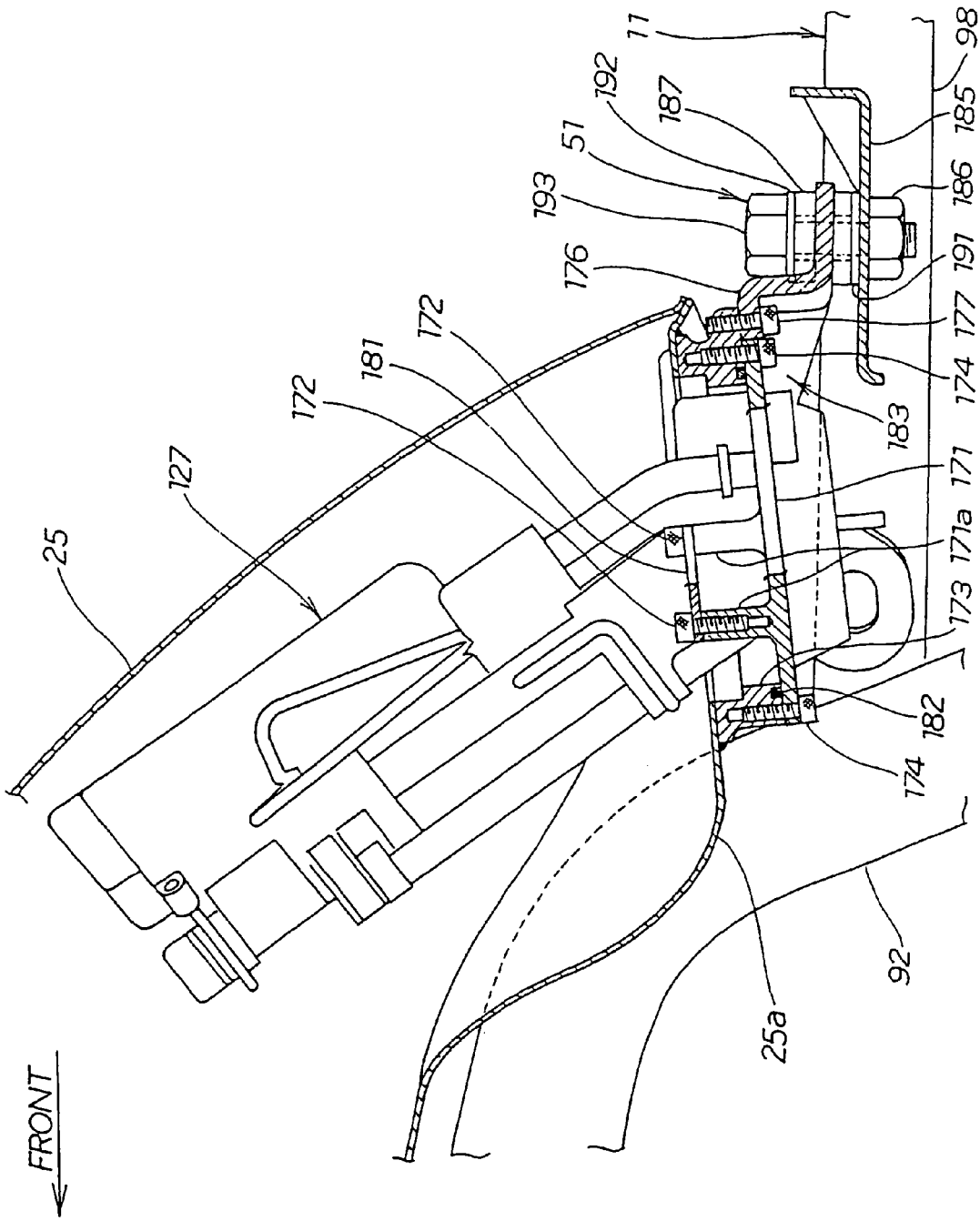
FIG. 9 is a cross-sectional view of a principal portion showing a mounting structure at the rear portion of the fuel tank of the two-wheeler according to the present invention.

FIG. 9 is a cross-sectional view of a principal portion showing a mounting structure at the rear portion of the fuel tank of the two-wheeler according to the present invention, showing that a supporting plate 171 for supporting the fuel pump 127 is attached to the end of the fuel pump 127 with bolts 172 . . . , a pump mounting member 173 of aluminum alloy for mounting the fuel pump 127 is welded to the rear portion of the bottom wall 25a of the fuel tank 25, the supporting plate 171 is attached to the pump mounting member 173 with bolts 174 . . . , and a tank mounting stay 176 for mounting the fuel tank 25 to the vehicle body frame 11 (more specifically, the rear mounting members 51 provided on the seat rails 98, 98 (one of the seat rails 98 is not shown in the drawing) are attached to the rear portion of the pump mounting member 173 with bolts 177 . . . .

The supporting plate 171 is a part formed integrally with column portions 171a . . . to be mounted to a pump-side plate 181 provided on the side of the fuel pump 127, and is mounted to the pump mounting member 173 via an O-ring 182.

A rear-tank mounting portion 183 provided at the rear of the fuel tank 25 for mounting the fuel tank 25 to the vehicle body frame 11 includes the above-described tank mounting stay 176 and the pump mounting member 173 for supporting the tank mounting stay 176.

The rear mounting member 51 on the vehicle body frame 11 includes a rear-tank supporting plate 185 bridged between the left and right seat rails 98, 98 and having a substantially crank-shaped cross section, a nut 186 welded to the rear-tank supporting plate 185, a cushion rubber 187 fitted into a frame-side mounting hole (not shown) provided on the tank mounting stay 176, a washer 191 inserted between the cushion rubber 187 and the rear-tank supporting plate 185, a flanged collar 192 penetrating the cushion rubber 187 from above the cushion rubber 187, and a mounting bolt 193 penetrating through the flanged collar 192, the washer 191, and the rear-tank supporting plate 185 and screwed into the nut 186. The components other than the rear-tank supporting plate 185 of the rear mounting member 51 are provided in pairs on the left side and the right side.

Figure 10:
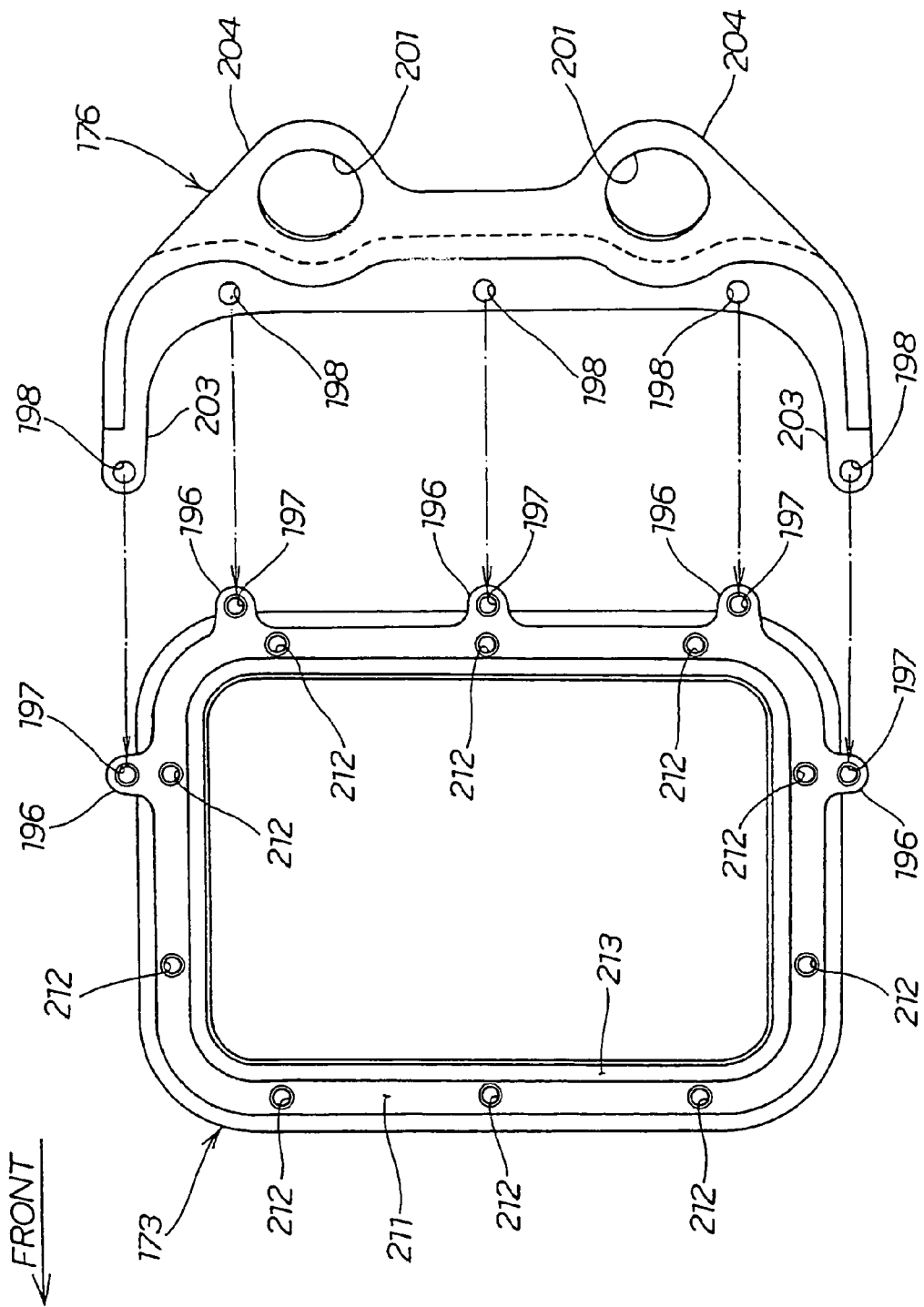
FIG. 10 is a bottom view showing the structure of a fuel tank mounting portion of the two-wheeler according to the present invention.

FIG. 10 is a bottom view showing the structure of the rear-fuel-tank mounting portion of the two-wheeler according to the present invention, in which the frame-shaped pump mounting member 173 is formed with stay mounting portions 196 . . . projecting outwardly, the stay mounting portions 196 . . . are formed with female screws 197, respectively, the tank mounting stay 176 of substantially an angular C-shape is formed with bolt insertion holes 198 . . . and frame-side mounting holes 201, 201, and the tank mounting stay 176 is attached to the pump mounting member 173 by aligning the respective bolt insertion holes 198 of the tank mounting stay 176 with the respective female screws 197 of the pump mounting member 173 and passing the bolts 177 (See FIG. 9) therethrough.

The tank mounting stay 176 is a member formed with front projections 203, 203 at the left and right ends thereof, and the bolt insertion holes 198 are formed on the extremities of the front projections 203, 203 so as not to align with the bolt insertion holes 198 at three other locations, so that the tank mounting stay 176 is fixedly connected to the pump mounting member 173 to prevent bending of the tank mounting stay 176.

The frame-side mounting holes 201 are circular holes formed on rear projections 204, 204 projecting rearwardly from the tank mounting stay 176.

A plate mounting portion 211 is provided for mounting the supporting plate 171 (See FIG. 9) on the side of the fuel pump 127 (See FIG. 9) to the pump mounting member 173. Female screws 212 . . . are formed on the plate mounting portion 211 with an O-ring groove 213 for mounting the O-ring 182 (See FIG. 9).

The mounting procedure of the fuel pump and the fuel tank described above will be described below.

Figure 11B:
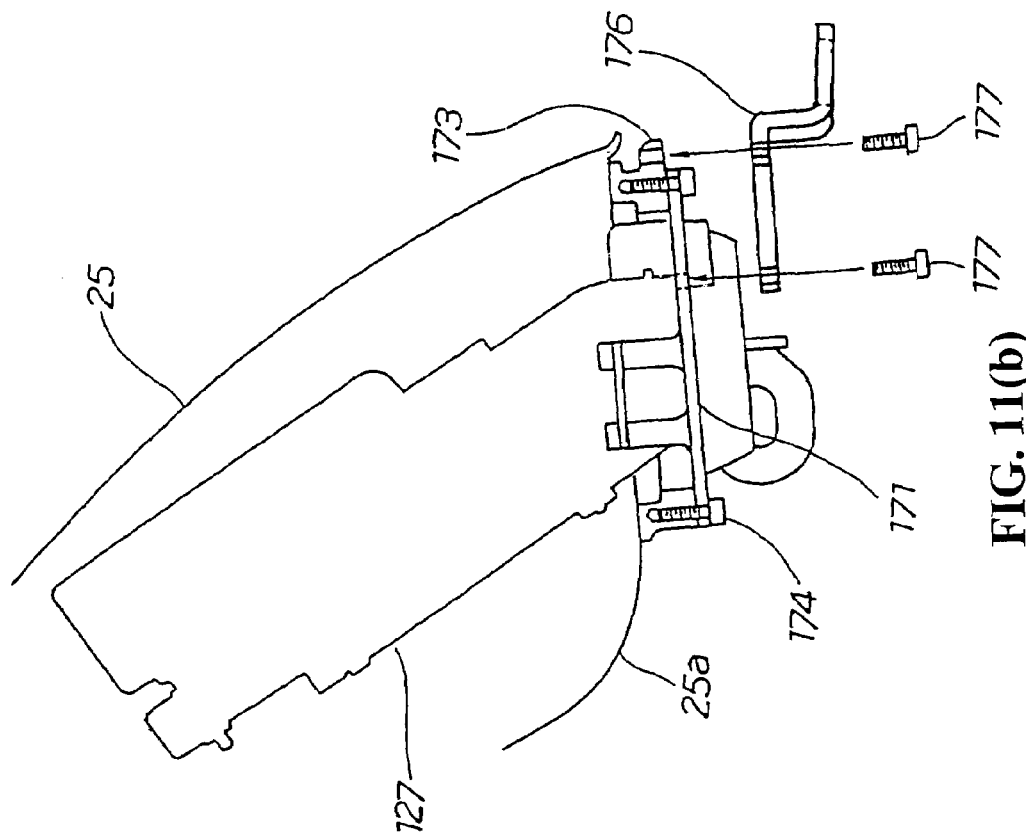
FIGS. 11(a) and 11(b) are first operational drawings showing a mounting procedure of the fuel pump and the fuel tank according to the present invention.
Figure 11A:
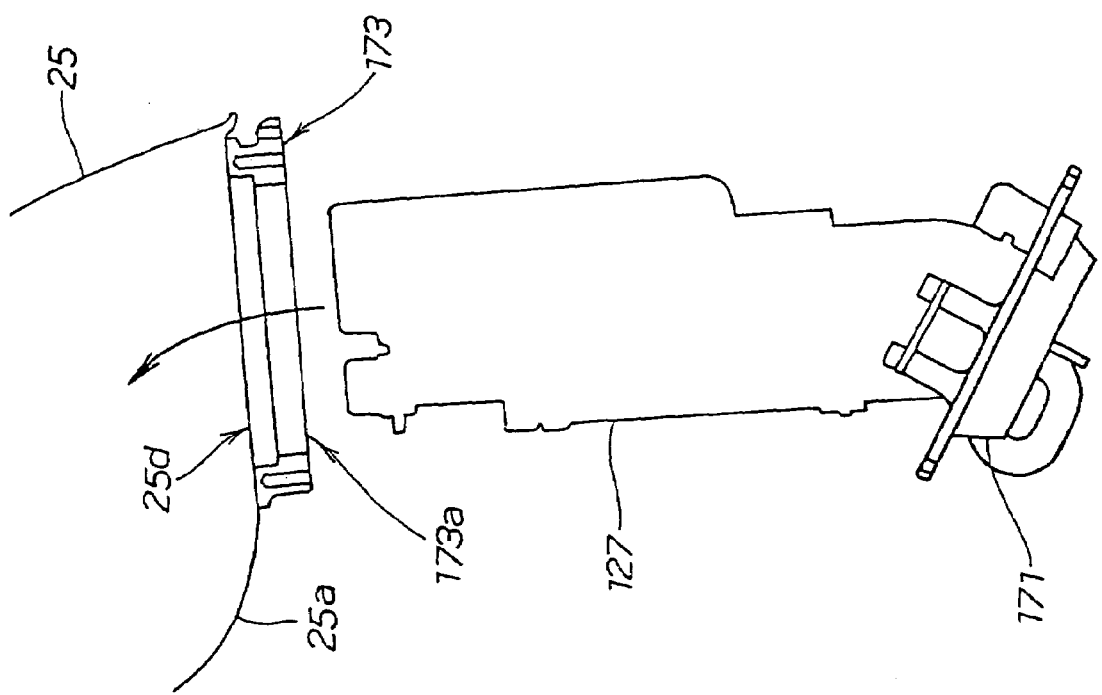

FIGS. 11(*a*), (*b*) are first operational drawings showing a mounting procedure of the fuel pump and the fuel tank according to the present invention.

In FIG. 11(*a*), the fuel pump 127 on which the supporting plate 171 (the portion indicated by a thick line) is attached is inserted into the fuel tank 25 as indicated by an arrow through the opening 25*d* formed on the bottom wall 25*a* of the fuel tank 25 and an opening 173*a* of the pump mounting member 173. Then, the supporting plate 171 is attached to the pump mounting member 173 with a bolt, not shown.

In FIG. 11(*b*), the tank mounting stay 176 is mounted to the pump mounting member 173 with bolts 177 . . . .

Figure 12B:
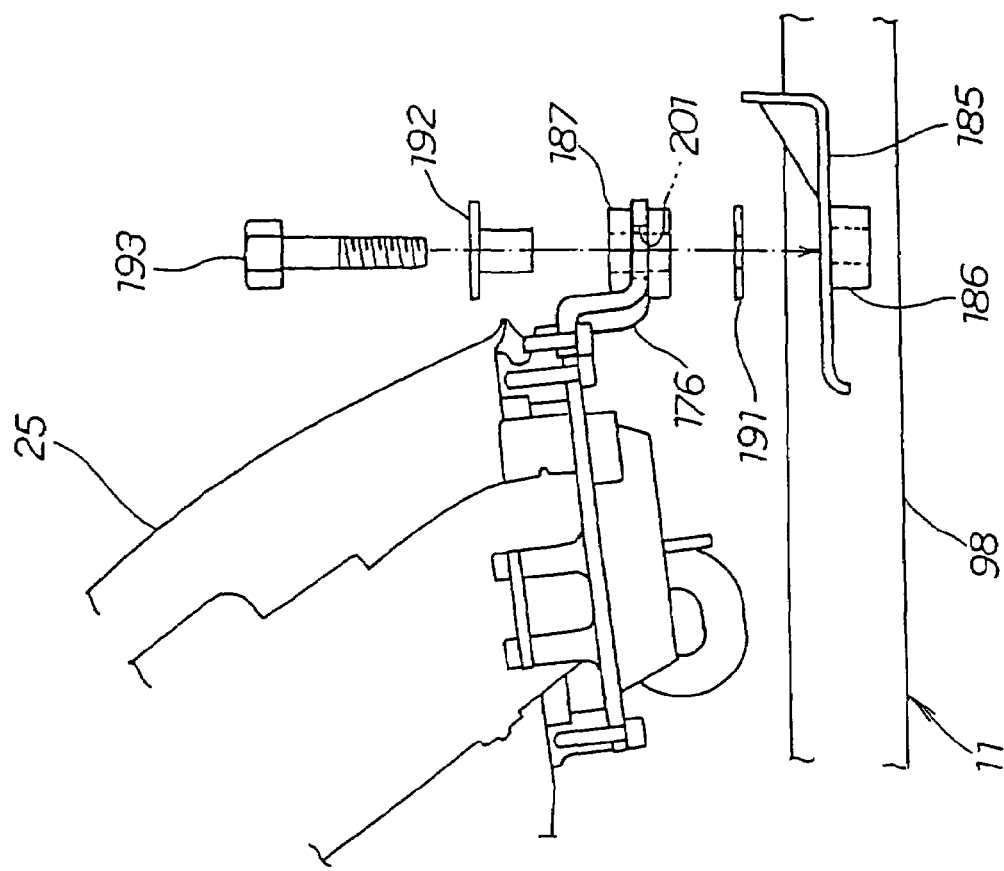
FIGS. 12(a) and 12(b) are second operational drawings showing a mounting procedure of the fuel pump and the fuel tank according to the present-invention.
Figure 12A:
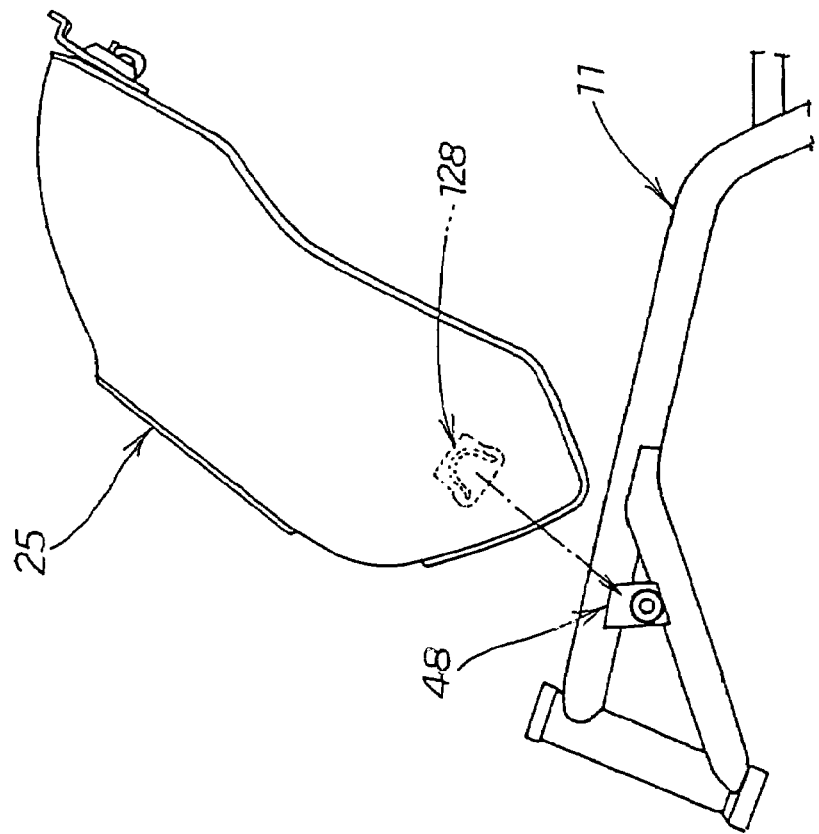

FIGS. 12(*a*), (*b*) are second operational drawings showing a mounting procedure of the fuel pump and the fuel tank according to the present invention.

In FIG. 11(*a*), the engaging member 128 of the fuel tank 25 is engaged with the front mounting member 48 of the vehicle body frame 11.

In FIG. 11(*b*), the cushion rubber 187 is fitted into the frame-side mounting hole 201 of the tank mounting stay 176, the washer 191 is placed on the lower surface of the cushion rubber 187, the flanged collar 192 is inserted into the cushion rubber 187, the mounting bolt 193 is penetrated into the flanged collar 192, the washer 191, and the rear-tank supporting plate 185 and screwed into the nut 186. The mounting of the fuel tank 25 to the vehicle body frame 11 is then completed.

Figure 13:
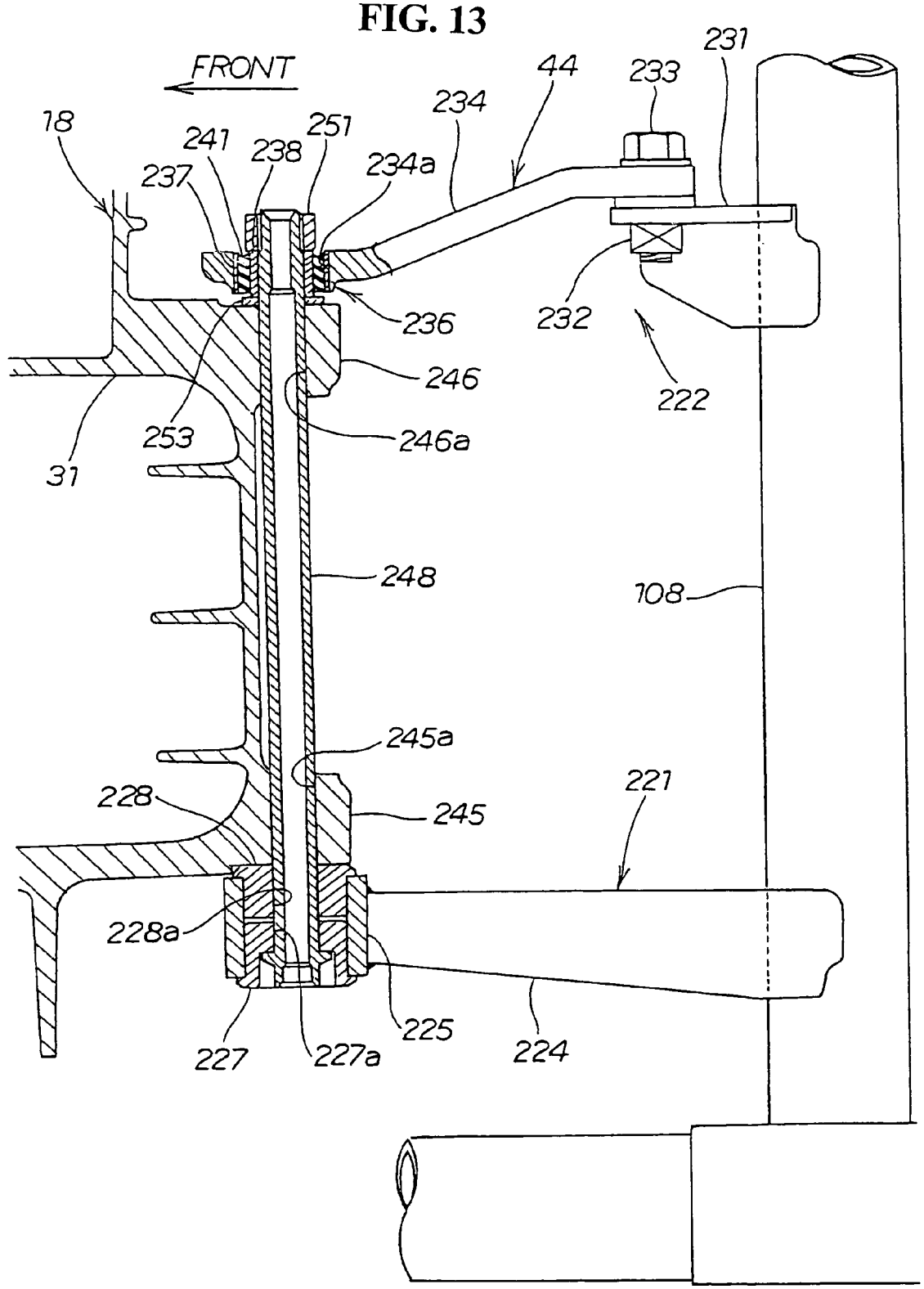
FIG. 13 is a cross sectional view showing the engine supporting structure of the two-wheeler according to the present invention.

FIG. 13 is a cross-sectional view showing an engine supporting structure of the two-wheeler according to the present invention, showing the supporting structure of the engine 18 by the rear upper engine hanger 44.

The rear upper engine hanger 44 includes a left hanger 221 and a right hanger 222 projecting forwardly from the left and right of the second cross pipe 108, respectively.

The left hanger 221 includes a left extending member 224 formed by press molding a plate into the angular C-shape in cross section, and a cylindrical member 225 mounted at the extremity of the extending member 224.

The cylindrical member 225 is formed by press fitting a metallic first flanged collar 227 and a metallic second flanged collar 228, respectively, from the end. The first flanged collar 227 and the second flanged collar 228 are members having bolt insertion holes 227*a*, 228*a*, respectively, formed thereon.

The right hanger 222 includes a base member 231 formed by press molding a plate into an L-shape in cross section, and a right extending member 234 connected via a nut 232 and a bolt 233 attached to the base member 231.

The right extending member 234 is a member formed with a through-hole 234*a* at the extremity thereof and includes a tube bush 236 press-fitted into the through-hole 234*a*.

The tube bush 236 includes an outer cylinder 237, an inner cylinder 238 disposed inside the outer cylinder 237, and a shock absorbing rubber member 241 adhered between the outer cylinder 237 and the inner cylinder 238 by vulcanizing.

A vehicle-body-side left mounting portion 245 and the vehicle-body-side right mounting portion 246 project rearwardly and upwardly from the rear portion of the crankcase 31 of the engine 18. The rear upper portion of the engine 18 is supported by the rear upper engine hanger 44 by forming bolt insertion holes 245*a*, 246*a* on the vehicle-body-side left mounting portion 245 and the vehicle-body-side right mounting portion 246, inserting a hollow supporting bolt 248 into a bolt insertion hole 227*a* of the first flanged collar 227, a bolt insertion hole 228*a* of the second flanged collar 228, the bolt insertion holes 245*a*, 246*a*, and the inner cylinder 238 of the tube bush 346, and screwing supporting nut 251 into the extremity of the supporting bolt 248. A washer 253 is interposed between the vehicle-side right mounting portion 246 and the inner cylinder 238 of the tube bush 236.

The engine 18 is supported by the front engine hanger 43, the rear upper engine hanger 44, and the rear lower engine hanger 46 as shown in FIG. 1.

The front engine hanger 43 and the rear lower engine hanger 46 are fixedly joined with the engine 18 since it supports the engine 18 via a metallic collar as in the case of the left hanger 221 described above. In this manner, the reason why the engine 18 is resiliently supported by the rear upper engine hanger 44 out of the three engine hanger 43, 44, and 46, especially by the right hanger 222 with the intermediary of the tube bush 236 is because the rigidity of the vehicle body frame 11 with the engine 18 mounted thereon can be adjusted by changing the setting of hardness of rubber. In other words, the present invention provides slight ductility to the vehicle body frame 11 in comparison with the case of joining rigidly via metallic collars at all the points of the engine hanger.

Another reason why the engine 18 is resiliently supported by the right hanger 222 is that maintenance can be performed easily in comparison with other engine hangers 43, 46 and the left hanger 221.

The tube bush 236 can be attached to and detached from the right extending member 234 easily by loosening the supporting nut 251 and removing the same from the supporting bolt 248, and loosening the bolt 233 of the right hanger 222 and removing the right extending member 234 from the base member 231.

The supporting bolt 248 is reduced in weight by forming a hollow portion therein.

The mounting procedure of the engine 18 to the above-described rear upper engine hanger 44 will be described below.

FIGS. 14(*a*)–(*d*) are operational drawings showing a mounting procedure of the engine to the rear upper engine hanger of the two wheeler according to the present invention.

In FIG. 14(*a*), the tube bush 236 is press-fitted into the through hole 234*a* of the right extending member 234 and the washer 253 is placed on the side surface of the tube bush 236.

Figures 14A, 14B, 14C, 14D:
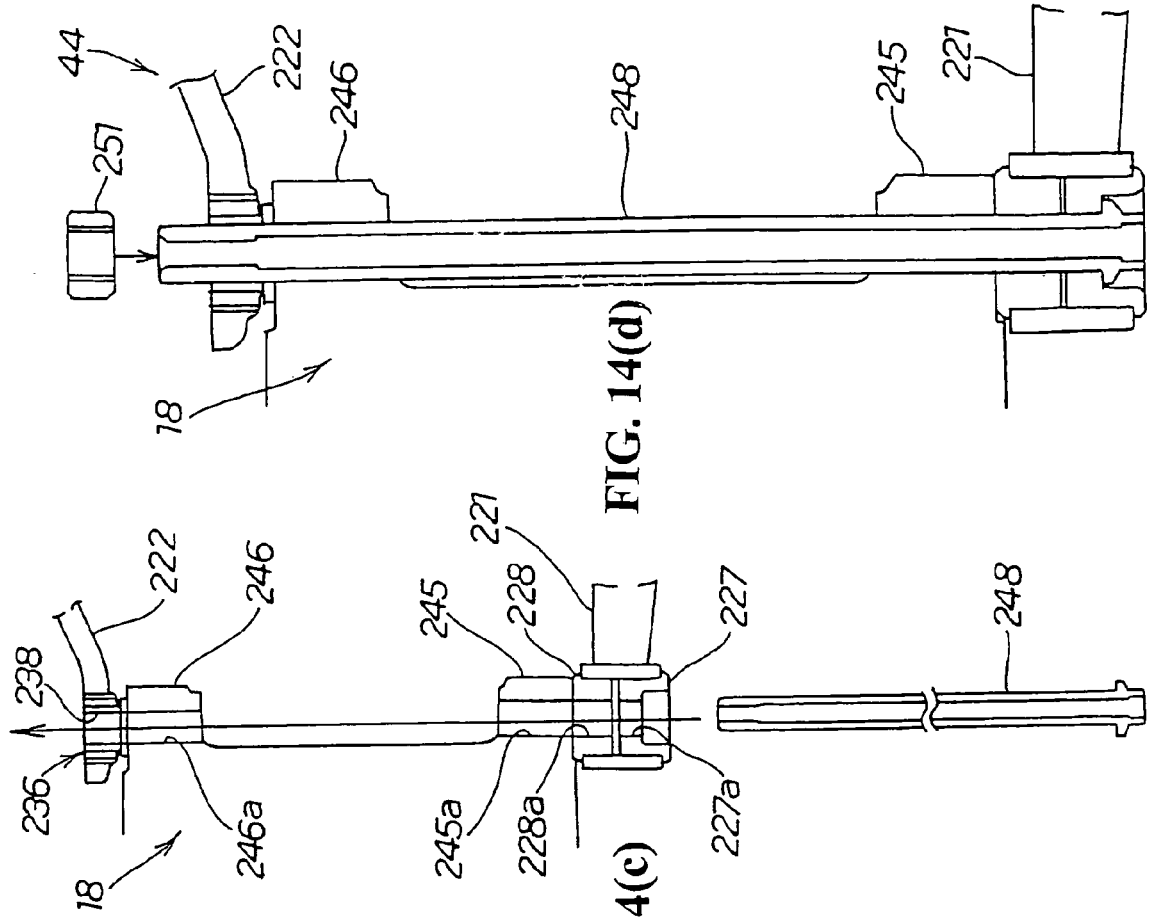
FIGS. 14(a) to 14(d) are operational drawings showing the mounting procedure of the engine to the rear upper engine hanger of the two-wheeler according to the present invention.
Figure 15:
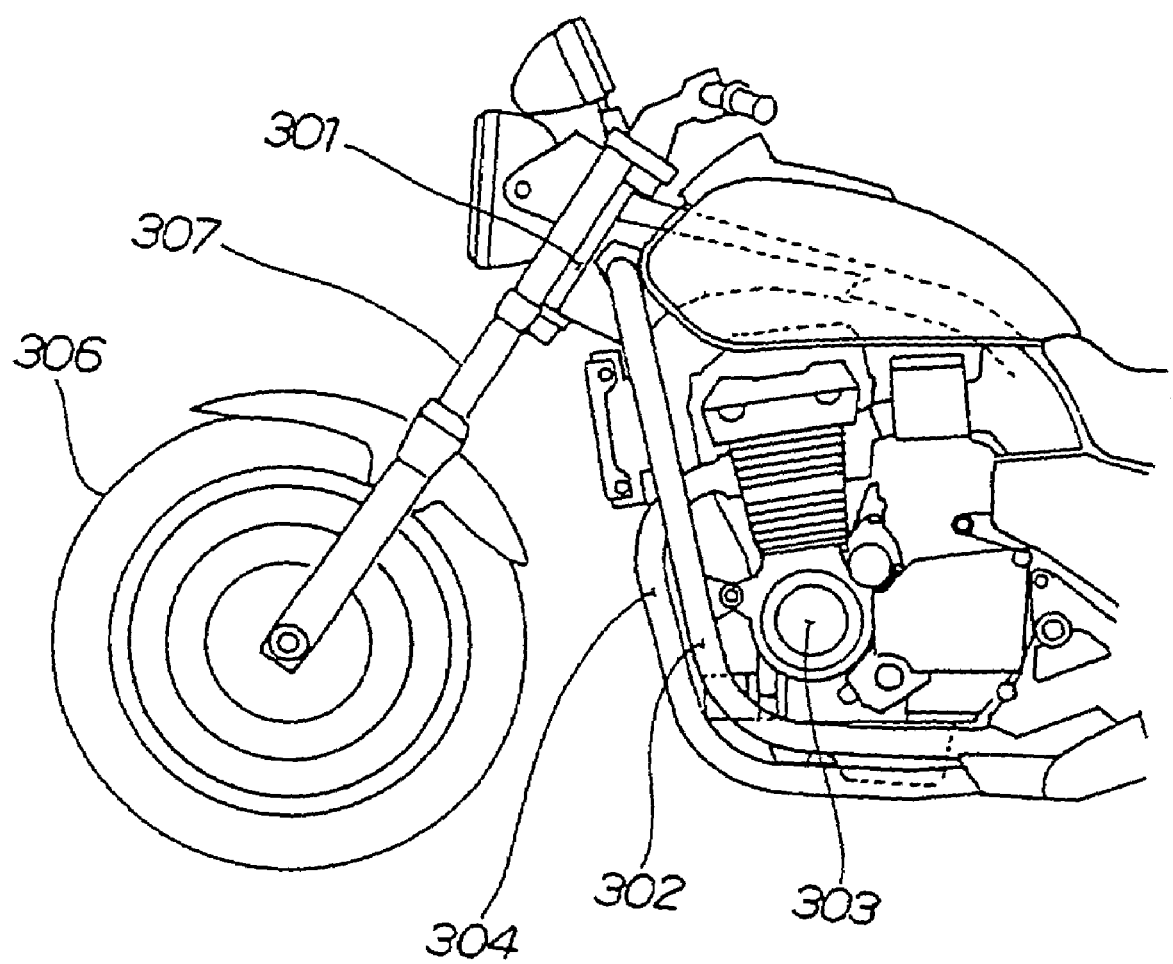
FIG. 15 is a side view of a vehicle body frame structure for a two-wheeler in the related art.

In FIG. 14(b), the first flanged collar 227 and the second flanged collar 228 are press-fitted into the inner surface of the cylindrical member 225 of the left hanger 221.

In FIG. 14(c), the vehicle-body-side left mounting portion 245 and the vehicle-body-side right mounting portion 246 of the engine 18 are disposed between the left hanger 221 and the right hanger 222, and the supporting bolt 248 is inserted through the bolt insertion hole 227a of the first flanged collar 227, the bolt insertion hole 228a of the second flanged collar 228, the bolt insertion hole 245a of the vehicle-body-side left mounting portion 245, the bolt insertion hole 246a of the vehicle-body-side right mounting portion 246, and the inner cylinder 238 of the tube bush 236.

In FIG. 14(d), the supporting nut 251 is screwed into the extremity of the supporting bolt 248. The mounting of the engine 18 to the rear upper engine hanger 44 is then completed.

In the embodiment of the present invention, the recesses formed on the first cross pipe are arcuate shape. However, the shape is not limited thereto, and when the cross section of the exhaust pipe is flat in the fore-and-aft direction, for example, an oval or an elongated circle, the recesses may be formed into the shape corresponding to the outer periphery of the exhaust pipe.

Also, while the recesses are formed on the front side of the cross pipe, they may be formed on the back side of the cross pipe.

In addition, while the shape of the radiator, which is a heat-discharging member, is arcuate, it is not limited thereto, and it may be such shape that the portion between the exhaust pipes of the two cylinders on the central side is straight, and the straight portion is inclined or curved forwardly in front of the two exhaust pipes.

The vehicle frame structure of the present invention is suitable for a two-wheel vehicle having exhaust pipes extending downwardly from the front of the engine, which is supported by the vehicle body frame.

Figure 16:
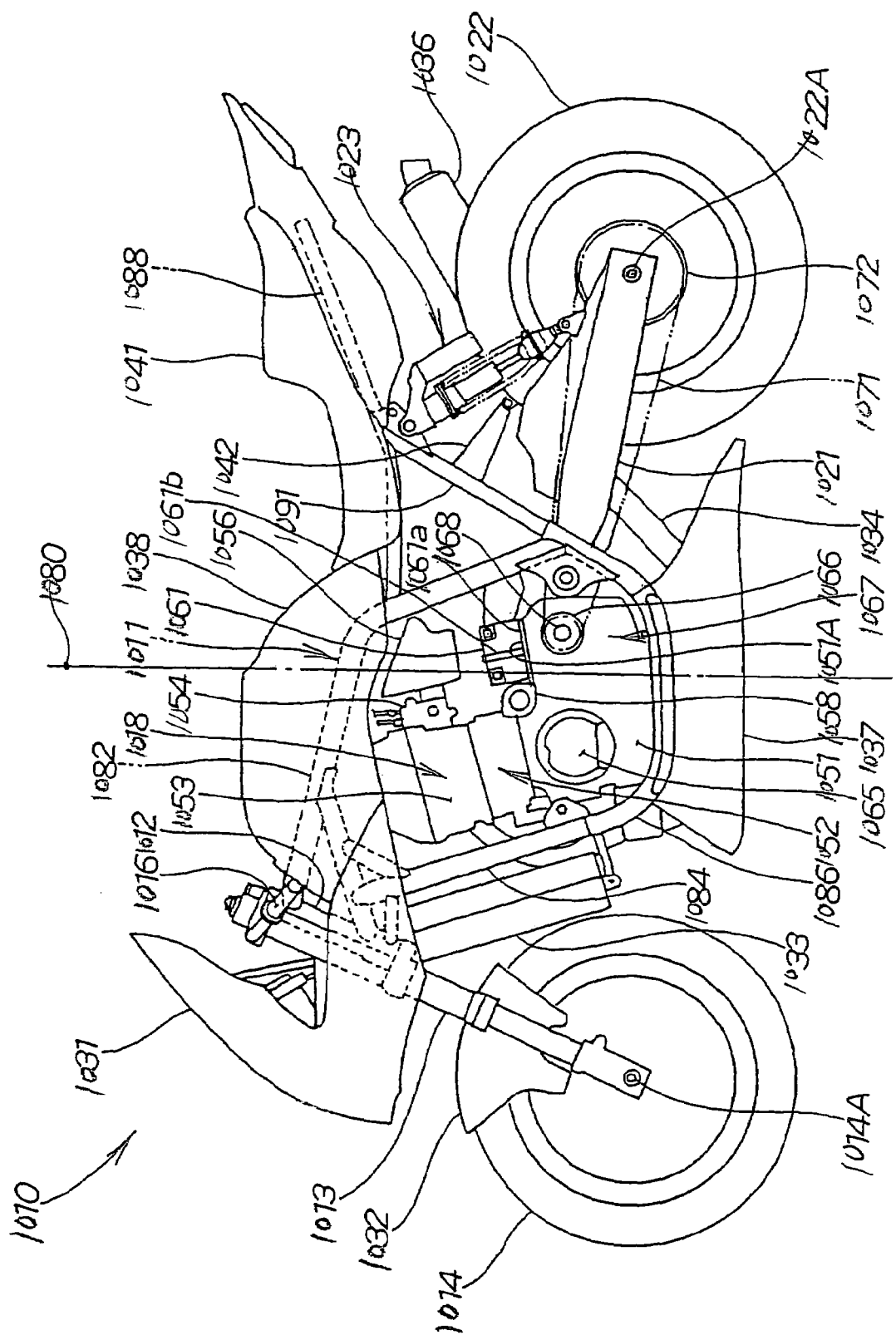
FIG. 16 is a side view of two-wheeler according to the present invention.

FIG. 16 is a side view of a two-wheeler according to the present invention. A motorcycle 1010 is a two-wheel vehicle assembled in such a manner that a front fork 1013 is steerably attached to a head pipe 1012 provided at the front of a vehicle body frame 1011 of a cradle-shape, a front wheel 1014 is attached to the lower end of the front fork 1013, a handle 1016 is mounted on top of the front fork 1013, an engine 1018 is mounted to the inner side of the vehicle body frame 1011, a swing arm 1021 is attached to the rear lower end of the vehicle body frame 1011 so as to be capable of swinging in the vertical direction, a rear wheel 1022 is mounted to the rear end of the swing arm 1021, and a pair of left and right rear cushion units 1023, 1024 (only the reference numeral 1023 on the nearer side is shown) are mounted so as to extend between the upper rear portion of the vehicle body frame 1011 and the rear portion of the swing arm 1021.

An upper cowl 1031 is provided for covering the upper front portion of the motorcycle 1010 with a front fender 1032 for covering the upper portion of the front wheel 1014. A radiator 1033 is provided for cooling the engine 1018 with exhaust pipes 1034 connected to the engine 1018. A muffler 1036 is connected to the exhaust pipes 1034 with an under cowl 1037 for covering the lower portions of the engine 1018 and the exhaust pipes 1034. A fuel tank 1038 is mounted on the upper portion of the vehicle body frame 1011 with a sheet 1041 for two disposed behind the fuel tank 1038. A muffler 1042 is provided together with a stay for supporting the muffler 1036 to the vehicle body frame 1011.

The engine 1018 includes a crankcase 1051, and a cylinder unit 1052 mounted substantially vertically to the front of the crankcase 1051, and is provided with the above-described exhaust pipes 1034 attached to the front of a cylinder head 1053, which constitutes the cylinder unit 1052. A carburetor 1054 and an air-cleaner 1056 are attached in sequence at the rear of the cylinder head 1053.

The crankcase 1051 is a member provided, on an upper surface 1051A of the rear portion thereof, with a cell motor 1058 disposed in the vicinity of a mounting portion of the cylinder unit 1052, and a battery 1061 disposed adjacent to the cell motor 1058.

The battery 1061 is, specifically, fixed to the upper surface 1051A of the crankcase via a tray 1061a by a band 1061b.

Figure 17:
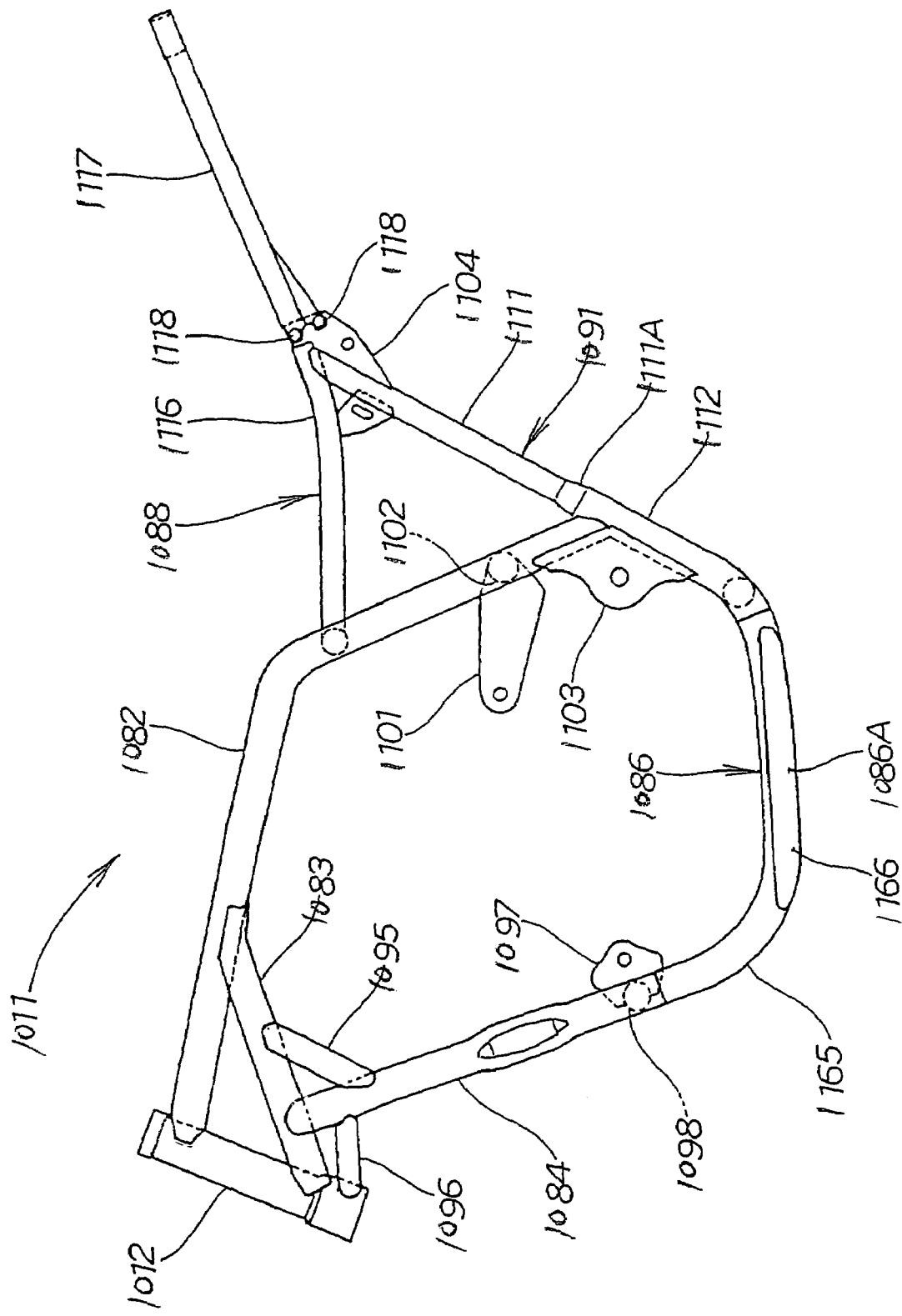
FIG. 17 is a side view showing a vehicle body frame of the two-wheeler according to the present invention.

In FIG. 17, an AC generator 1065 (described in detail later) that covers the projection from the crankcase 1051 sideward of the vehicle body. A drive sprocket 1066 is mounted to an output shaft 1068 of a speed changer 1067 provided integrally with the rear portion of the engine 1018. A chain 1071 is wound around a driven sprocket 1072 and the drive sprocket 1066 mounted integrally with the rear wheel 1022.

A vertical line 1080 in the drawing is a straight line passing through a midpoint of a distance between an axle 1014A of the front wheel 1014 and an axle 1022A of the rear wheel 1022 in the fore-and-aft direction, and the center of gravity of the motorcycle 1010 is located on the vertical line 1080.

FIG. 17 is a side view showing the vehicle body frame of the two-wheeler according to the present invention. The vehicle body frame 1011 includes the head pipe 1012, a pair of left and right main pipes 1082, 1082 extending from the head pipe 1012 rearwardly and obliquely downwardly, and then further extending rearwardly and obliquely downwardly (only the reference numeral 1082 on the near side is shown), front pipes 1083, 1083 (only the reference numeral 1083 on the near side is shown) extend from the lower portion of the head pipe 1012 to the main pipes 1082, 1082, a pair of left and right down tubes 1084, 1084 (only the reference numeral 1084 on the near side is shown) extend substantially downwardly from the front pipes 1083, 1083, lower pipes 1086, 1086 (only the reference numeral 1086 on the near side is shown) extending from the lower ends of the down tubes 1084, 1084 so as to curve rearward, seat rails 1088, 1088 (only the reference numeral 1088 on the near side is shown) extending rearward from the upper rear portions of the main pipes 1082, 1082, and sub pipes 1091, 1091 (only the reference numeral 1091 is shown) connected to the intermediate portions of the seat rails 1088, 1088 and the rear ends of the main pipes 1082, 1082, and also connected to the lower pipes 1086, 1086 at the lower ends thereof.

In the drawing, (only the reference numeral 1095 on the near side is shown), and reference numerals 1096, 1096 (only the reference numeral 1096 on the near side is shown) designate reinforcing pipes 1095, 1095 and 1096, 1096 and front engine hangers 1097, 1097 (only the reference numeral 1097 on the near side is shown) are attached to a first cross pipe 1098 extending between the down tubes 1084, 1084 for supporting the front portion of the engine 1018 (See FIG. 16). Rear engine hangers 1101, 1101 are attached to a second cross pipe 1102 extending between the main pipes 1082, 1082 for supporting the rear portion of the engine 1018. Pivot plates 1103, 1103 are attached to joints between the main pipes 1082, 1082 and the sub pipes 1091, 1091 for attaching a swing shaft (that is, a pivot shaft) of the swing arm 1021 (See FIG. 16). Cushion mounting plates 1104, 1104 are attached to joints between the seat rails 1088, 1088 and the sub pipes 1091, 1191 for mounting the upper end of the respective rear cushion units 1023, 1024 (See FIG. 16).

The sub pipe 1091 is a member formed by connecting a first sub pipe 1111 which is connected to the seat rail 1088, and a second sub pipe 1112 which is connected to the main pipe 1082 and the lower pipes 1086, 1086. A tapered portion 1111A which increases in outer diameter toward the end is formed at the end of the first sub pipe 1111, which is connected to the second sub pipe 1112.

Figure 18:
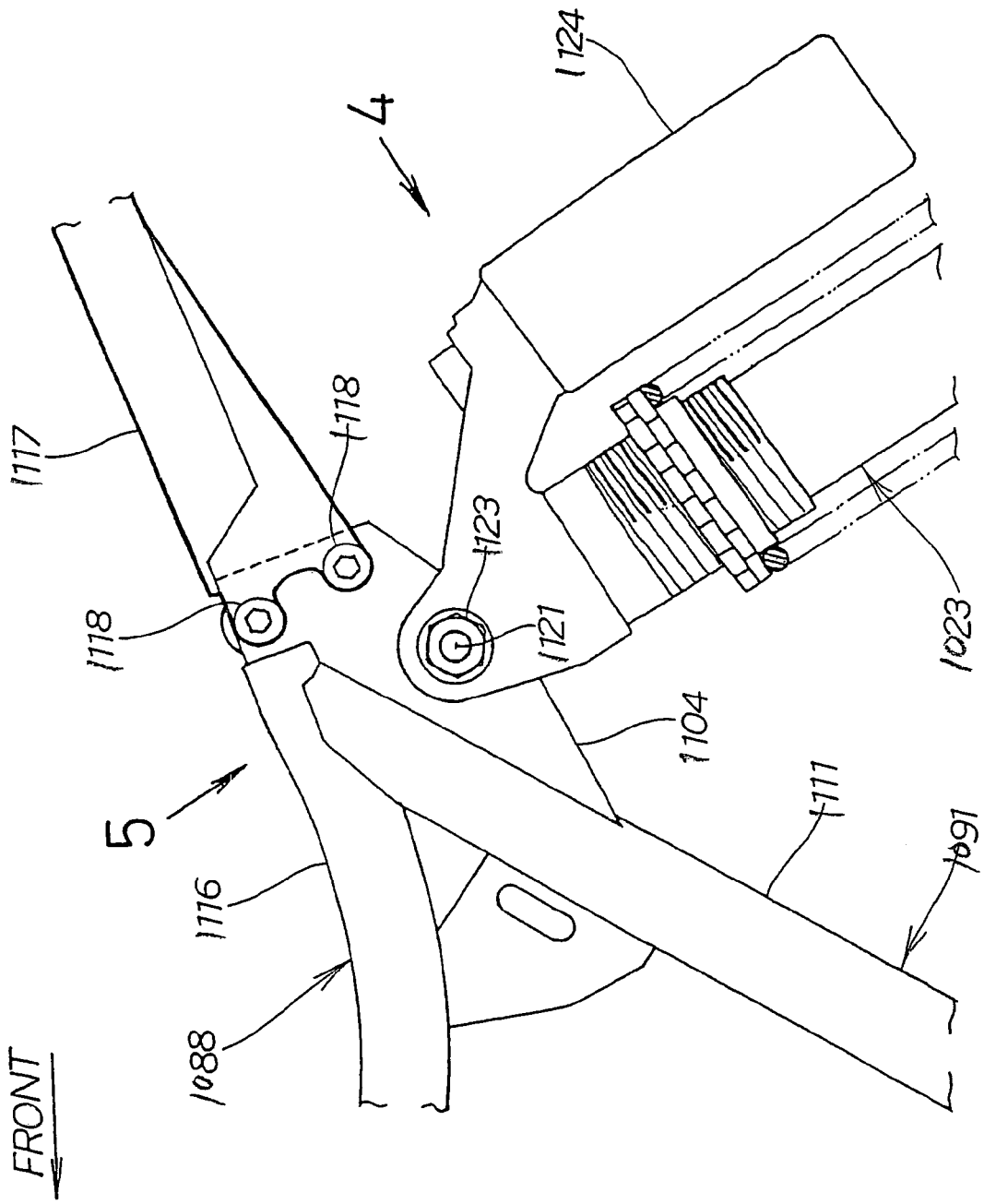
FIG. 18 is a side view of a principal portion showing the rear portion of the two-wheeler according to the present invention.

FIG. 18 is a side view of a principal portion showing the rear portion of the two-wheel vehicle according to the present invention (an arrow "FRONT" in the drawing indicates the front of the vehicle, hereinafter), showing a state in which the seat rail 1088 includes a first seat rail 1116 connected to the main pipe 1182 (See FIG. 17) and the sub pipe 1191 and a second seat rail 1117 connected to the first seat rail 1116 via the cushion mounting plate 1104. The second seat rail 1117 formed of an aluminum alloy angular pipe member is attached to the cushion mounting plate 1104 with bolts 1118, 1118. The outline of the second seat rail 1117 is indicated by a thick line for clear understanding of the shape.

As described above, by forming the second seat rail 1117 of aluminum alloy, a weight reduction of the vehicle body frame 1018 (See FIG. 16), and hence a weight reduction of the motorcycle 1010 (See FIG. 16), is achieved.

The rear shock absorber 1023 is a member attached at the upper end thereof to a shock absorber mounting bolt 1121 attached to the cushion mounting plate 1104 with a nut 1123. A reserve tank 1124 is provided in which oil coming in and out of a cylinder of the rear cushion unit 1023 is stored.

The rear shock absorber 1024 (not shown) has the same structure as the above-described rear cushion unit 1024, and is attached to the upper end thereof to a cushion mounting bolt 1122 (not shown, described later in detail) attached to the cushion mounting plate 1104 with the nut 1123.

Figure 19:
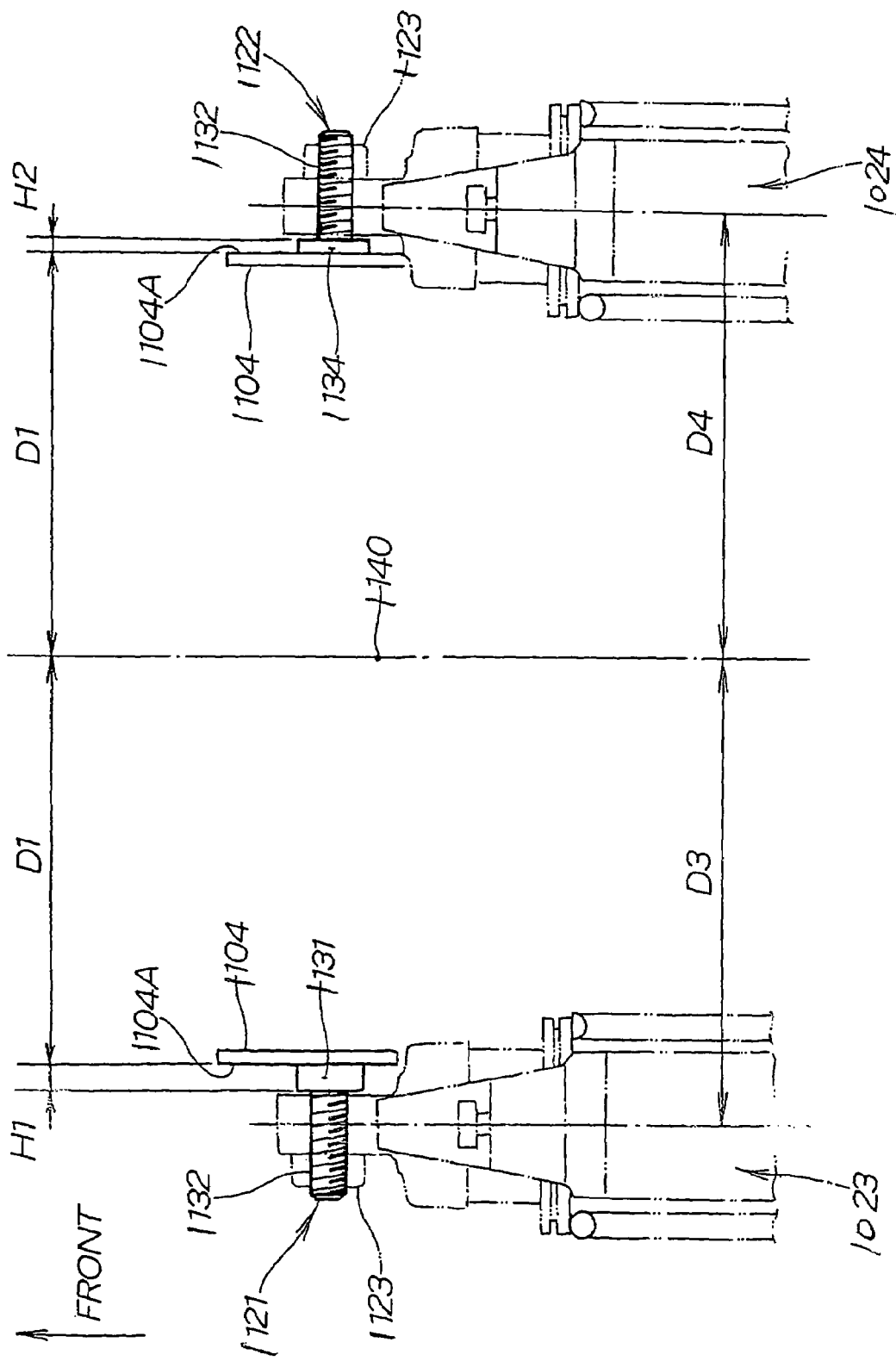
FIG. 19 is a drawing viewed in the direction indicated by an arrow 4 in FIG. 18.

FIG. 19 is a drawing viewed in the direction indicated by an arrow 4 in FIG. 18, showing a state in which the cushion mounting bolts 1121, 1122 are attached to the pair of left and right cushion mounting plates 1104, 1104, respectively, and the rear cushion units 1023, 1024 are attached to the cushion mounting bolts 1121, 1122 with the nuts 1123, 1123.

The cushion mounting bolt 1121 includes a column shaped portion 1131 mounted to the cushion mounting plate 1104, and a male screw portion 1132 formed integrally with the column shaped portion 1131.

The cushion mounting bolt 1122 includes a column shaped portion 1134 mounted to the cushion mounting plate 1104 and a male screw portion 1132 formed integrally with the column shaped portion 1134.

Here, when the center of the vehicle body of the motorcycle 1010 is represented by a centerline 1140, the distances from the centerline 1140 to side surfaces 1104A, 1104A of the cushion mounting plates 1104, 1104 are D1 on both the left and the right, and when the height of the column shaped portion 1131 of the cushion mounting bolt 1121 is represented by H1 and the height of the column shaped portion 1134 of the cushion mounting bolt 1122 is represented by H2, the height H2 is smaller than the height H1. In other words, when the distances from the centerline 1140 to the centers of the rear cushion units 1023, 1024 are represented by D3, D4, respectively, the distance D4 is smaller than the distance D3, and hence the rear cushion unit 1024 is located closer to the widthwise center of the vehicle in comparison with the rear cushion unit 1023.

Figure 20:
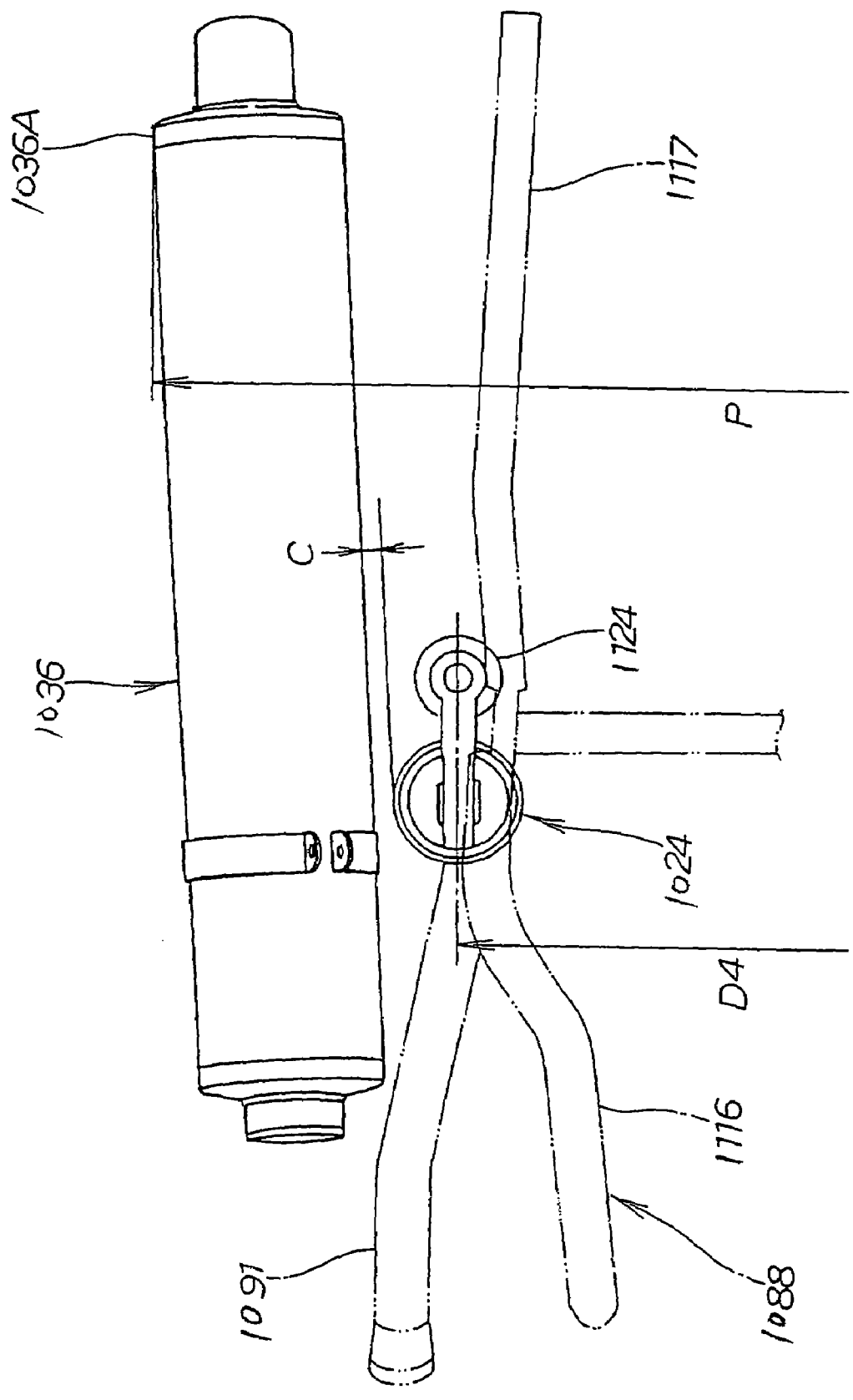
FIG. 20 is a drawing when viewed in the direction indicated by an arrow 5 in FIG. 18.

FIG. 20 is a drawing when viewed in the direction indicated by an arrow 5 in FIG. 18, showing that the muffler 1036 is disposed on the side of the rear cushion unit 1024 with respect to the vehicle body, that is, on the right side of the vehicle body.

When a distance between the fear cushion unit 1024 and the muffler 1036 in this state is represented by C, since the distance D4 of the rear cushion unit 1024 from the widthwise center of the vehicle is smaller than the distance D3 (See FIG. 19) of the rear cushion unit 1023 (See FIG. 19) from the widthwise center of the vehicle body, a projecting amount P of the rear portion 1036A of the muffler 1036, which projects the most toward the side of the vehicle body from the widthwise center of the vehicle, may further be reduced, while securing the distance C between the rear cushion unit 1024 and the muffler 1036.

FIG. 21 is a plan view showing the swing arm of the two-wheeler according to the present invention. The swing arm 1021 includes a left arm 1142 and a right arm 1143 extending in the fore-and-aft direction, respectively, with pivot shaft supporting portions 1147, 1148 attached to the respective front ends of the left arm 1142 and the right arm 1143 for mounting the swing arm 1021 to a pivot shaft 1145 so as to be capable of swinging freely, and a connecting portion 1151 for connecting the left arm 1142 and the right arm 1143.

The right arm 1143 is a member obtained by joining a first arm half 1153 and a second arm half 1154 by welding. A joint portion 1155 is provided between the first arm half 1153 and the second arm half 1154.

Axle supporting portions 1142A. 1142B are provided at the respective rear ends of the left arm 1142 and the right arm 1143 for supporting the axle 1022A of the rear wheel 1022. A left bracket 1157 is provided for mounting the lower end of the rear cushion unit 1023 (See FIG. 19) to the swing arm 1021. A right bracket 1158 is provided for mounting the lower end of the rear cushion unit 1024 (See FIG. 19) to the swing arm 1021.

Figure 22A:
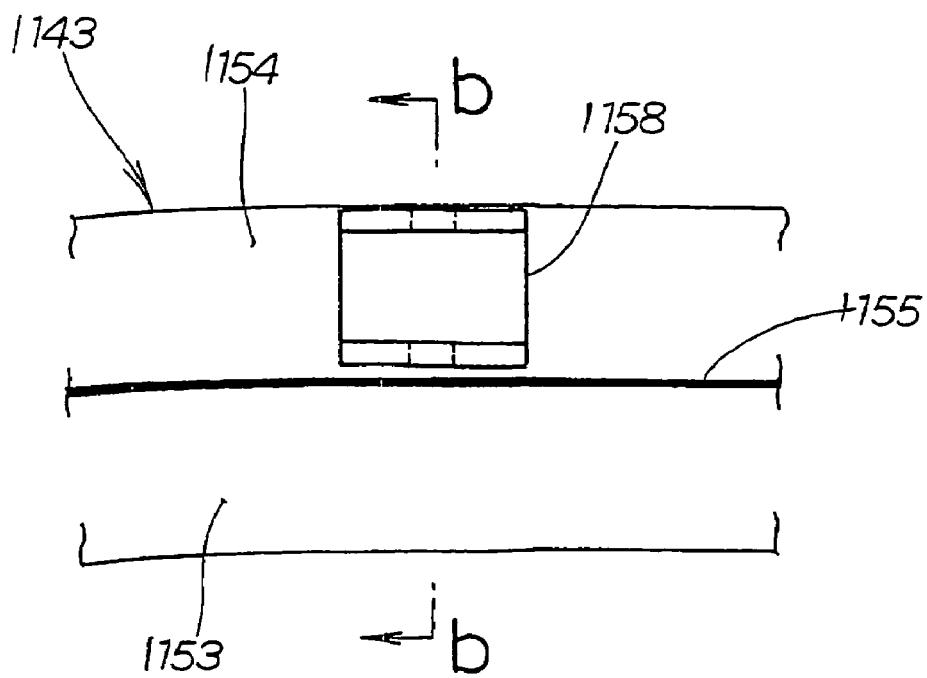
FIGS. 22(a) and 22(b) are explanatory drawings of a rear cushion unit mounting bracket of the two-wheeler according to the present invention.

FIGS. 22(a), (b) are explanatory drawings of the rear cushion unit mounting bracket of the two-wheeler according to the present invention, showing a mounting state of the right bracket 1158.

FIG. 22(a) is a plan view of the right bracket 1158, showing that the right bracket 1158 is mounted to the second arm half 1154 of the right arm 1143 along the joint portion 1155 at the position away from the joint portion 1155.

Figure 22B:
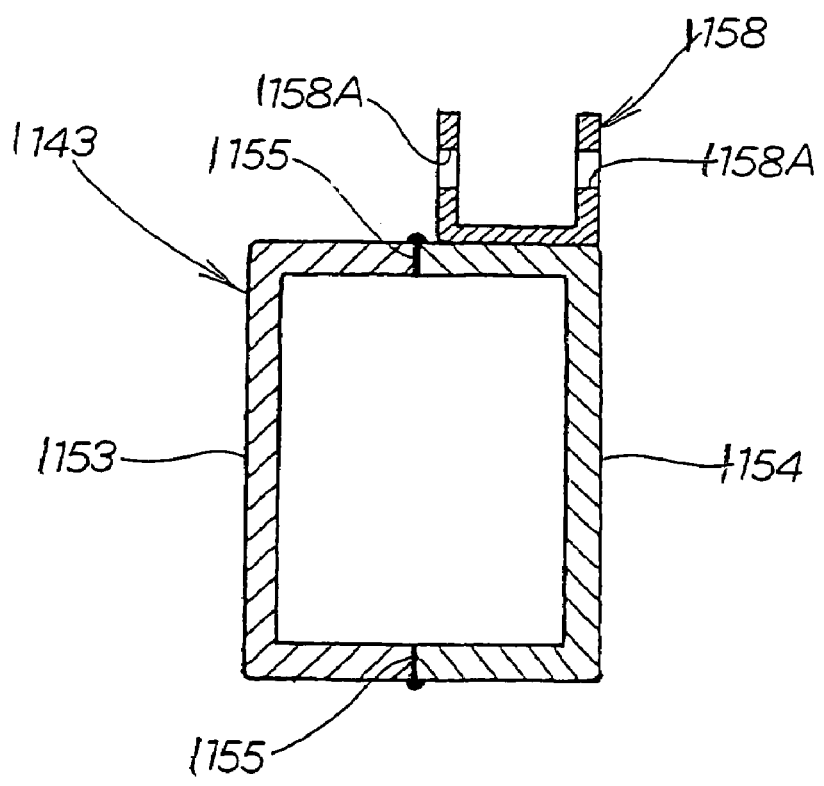

FIG. 22(b) is a cross-sectional view taken along the line b—b in FIG. 22(a), showing that the first arm half 1153 of angular C-shape in cross section and the second arm half 1154 of angular C-shape in cross section are mated and welded to form the right arm 1143, and the right bracket 1158 is mounted to the upper surface of the second arm half 1154 by welding.

The joint portion 1155 extends in the fore-and-aft direction along the substantially lateral center of the right arm 1143 in plan view.

Bolt insertion holes 1158A, 1158B are provided for mounting the rear cushion unit 1024 (See FIG. 19).

Figure 23:
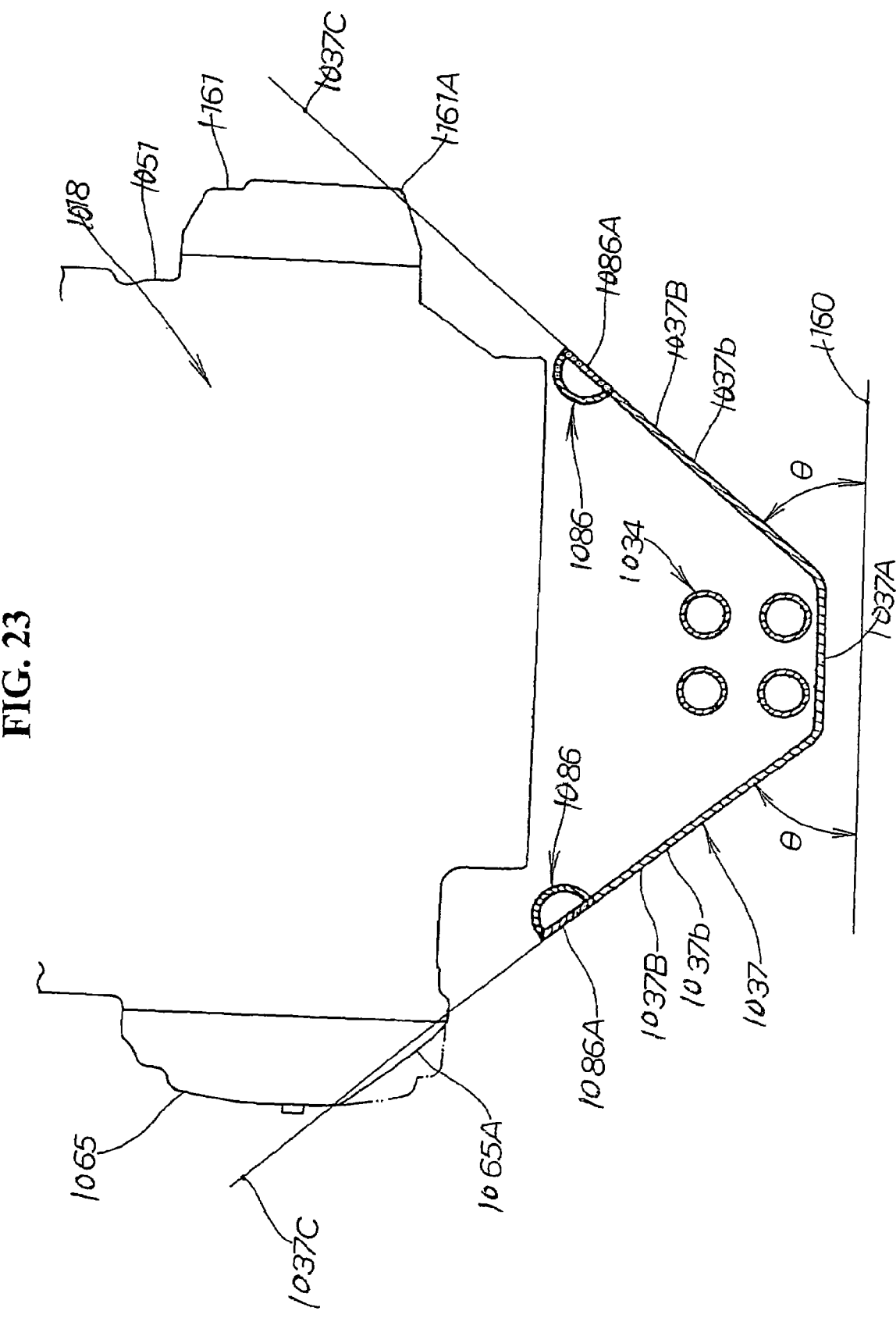
FIG. 23 is a back view of a principal portion of an engine and the portion below the engine of the two-wheeler according to the present invention.

FIG. 23 is a back view of a principal portion of the engine and the portion below the engine of the two-wheeler according to the present invention, showing that the under cowl 1037 includes a bottom portion 1037A and left and right inclined portions 1037B, 1037B formed integrally with the bottom portion 1037A and opening upward is attached to the lower pipes 1086, 1086, and continuous inclined planes 1086A continuing from the inclined planes 1037b, 1037b, which are the outer surfaces of the inclined portions 1037B, 1037B of the under cowl 1037 are formed on the lower pipes 1086, 1086 so that the lower pipes 1086, 1086 are formed into semi-circular shape in cross section. Reference sign θ designates angles of inclination of the inclined planes 1037b, 1037b and the continuous inclined planes 1086A, 1086A with respect to a horizontal line 1160.

FIG. 23 also shows that an inclined plane 1065A is formed substantially along an extension 1037c extending from the inclined plane 1037b of the under cowl 1037 that is formed on the AC generator cover 1065 for covering the side of an AC generator, that is, the extension 1037C, which is also the extension of the continuous inclined plane 1086A of the lower pipe 1086 that is brought substantially into line with the inclined plane 1065A. A comer 1161A of a clutch cover 1161 for covering the side of a clutch stored in the crankcase 1051 of the engine 1018 is brought substantially into line with the extension 1037C extending from the other inclined plane 1037b of the under cowl 1037.

FIG. 24 is a side view of the lower pipe of the two-wheeler according to the present invention. The lower pipe 1086 is a member including a pipe body 1165 being curved at the front and the rear and substantially straight at the center. A plate strip 1166 of a flat-plate shape is welded at an obliquely lower side portion of the pipe body 1165. The plate strip 1166 is formed with a continuous inclined plane 1086A. Cowl mounting portions 1086B, 1086B are provided to which the under cowl 1037 (See FIG. 23) is mounted.

Figure 25B:
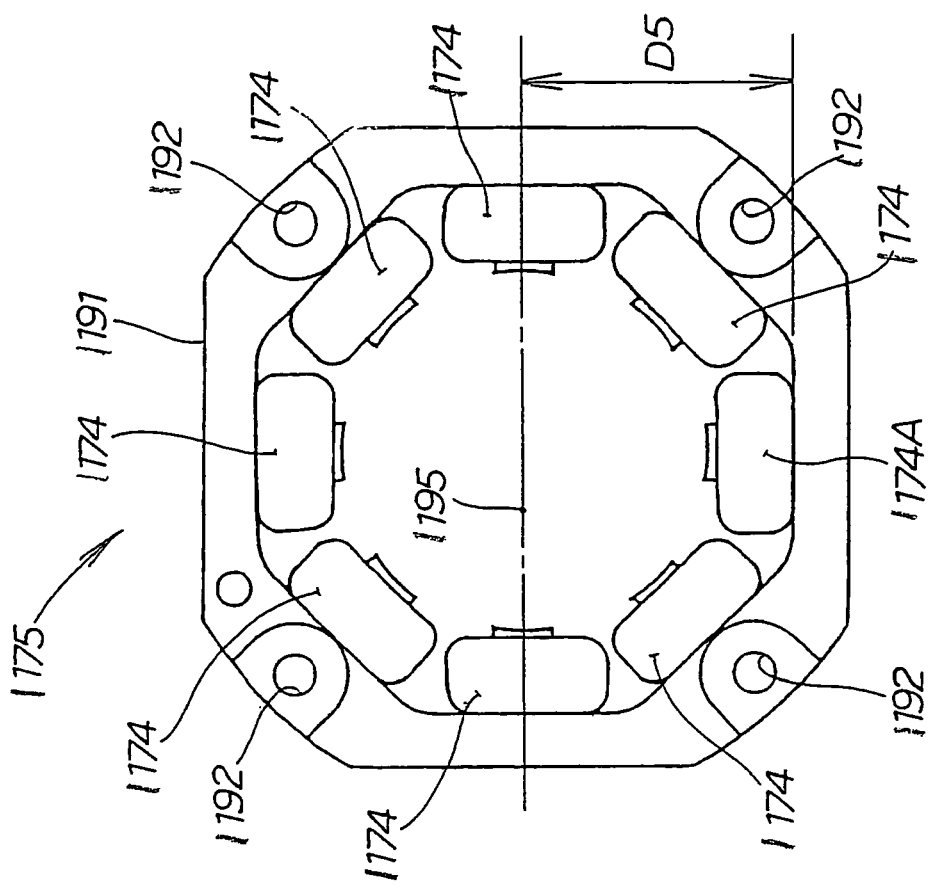
FIGS. 25(a) and 25(b) are explanatory drawings showing an AC generator according to the present invention.
Figure 25A:
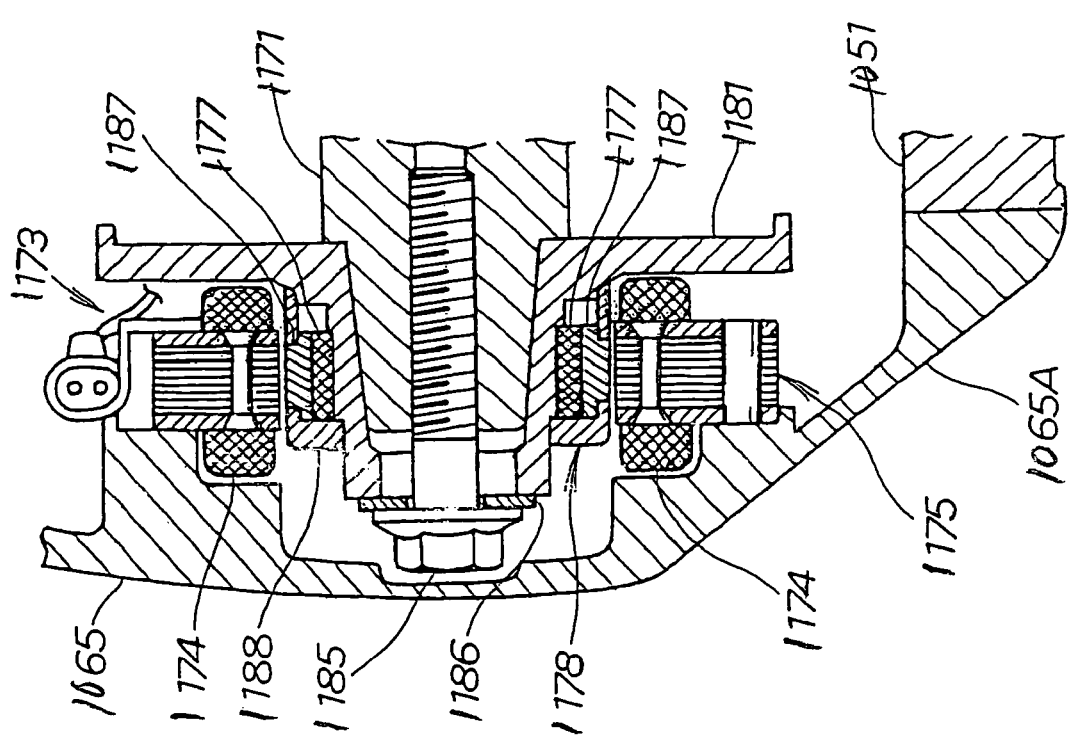

FIGS. 25(a), (b) are explanatory drawings showing the AC generator according to the present invention.

FIG. 25(a) is a cross-sectional view taken along a crankshaft 1171 rotatably mounted to the crankcase 1051. The AC generator 1173 is obtained by attaching a stator 1175 having a plurality of coils 1174 to the inner surface of the AC generator cover 1065 with a bolt, not shown, and mounting an inner rotor 1178 having a plurality of permanent magnets 1177 at the extremity of the crankshaft 1171 via a rotary member 1181.

A bolt 1185 is provided for mounting the rotary member 1181 to the crankshaft 1171. A washer 1186 is provided together with a magnetic body 1187 provided on the radial outside of the permanent magnets 1177. A rotor holding portion 1188 is provided for holding the permanent magnets 1177 and the magnetic body 1187.

FIG. 25(b) is a front view of the stator 1175. The stator 1175 includes a substantially octagonal frame member 1191 and the plurality of coils 1174 mounted inside the frame member 1191. Bolt holes 1192 . . . ( . . . represents that there are a plurality of members, hereinafter) are provided for mounting the stator 1175 to the AC generator cover 1065 (See FIG. 25(a)).

When one of the plurality of coils 1174 is represented by 1174A and the stator 1175 is mounted to the AC generator cover 1065 so that the coil 1174A comes to the lowest position of the engine with respect to other coils 1174, the coil 1174A is positioned inside of one side of the octagon. Therefore, for example, in comparison with the case in which the coil is mounted to the annular base member, a distance D5 from a straight line 1195 passing through the center of the stator 1175 to the lower end of the coil 1174A can be reduced in the present invention. Consequently, the inclined plane 1065A (See FIG. 25(a)) of the AC generator cover 1065 can be formed over a larger range.

The operation during travel of the under cowl 1037, the lower pipe 1086, and the AC generator cover 1065 described above will be described.

Figure 26:
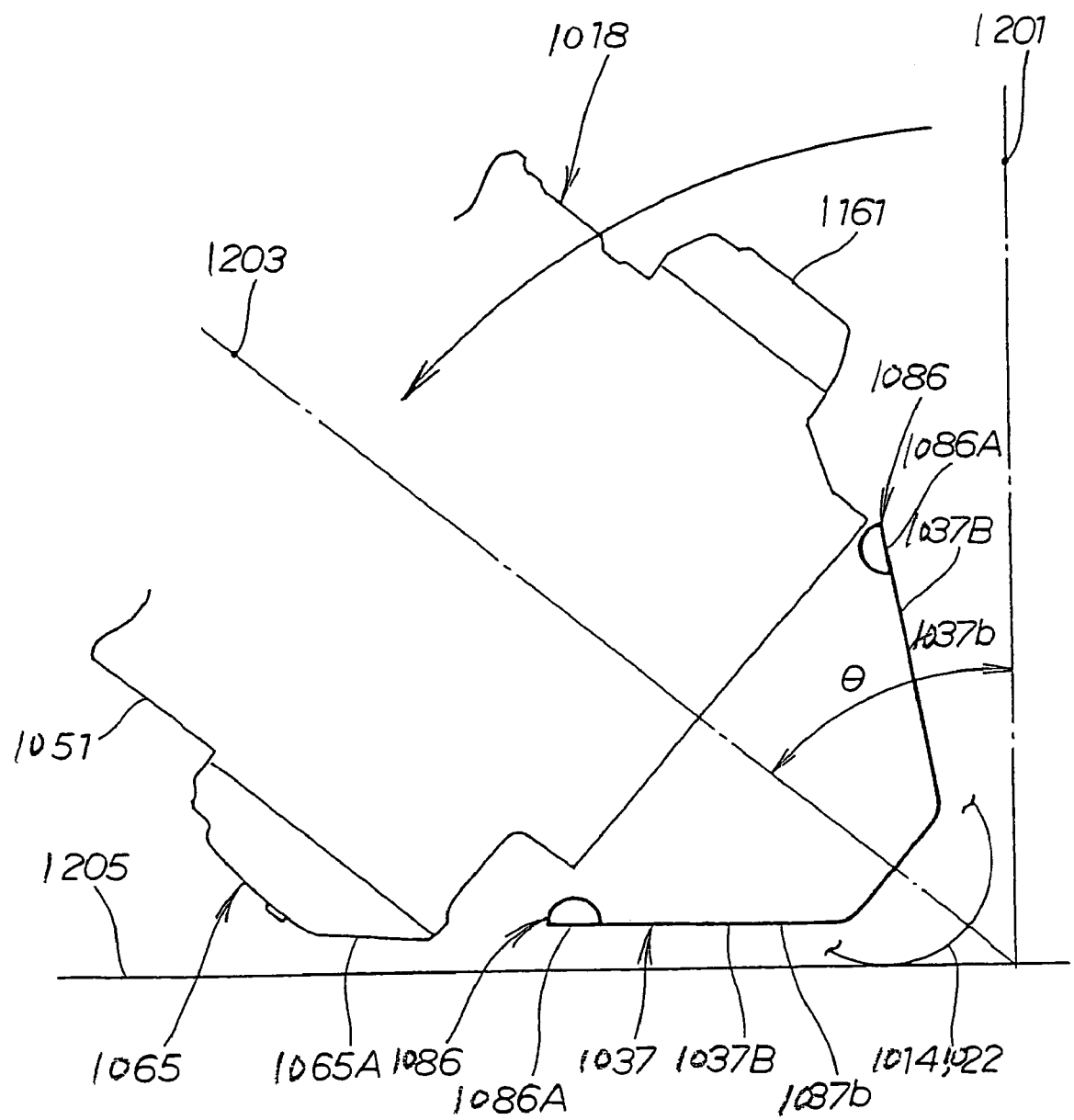
FIG. 26 is an operational drawing showing a state in which the two-wheeler according to the present invention is inclined during travel.

FIG. 26 is an operational drawing showing a state in which the two-wheeler according to the present invention is inclined during travel.

As described above, since the under cowl 1037 is formed with the inclined planes 1037b, 1037b, the lower pipes 1086, 1086 are formed with the continuous inclined planes 1086A, 1086A, and the AC generator-cover 1065 is formed with the inclined plane 1065A, the two-wheeler during travel can be inclined, for example, to an extent that a centerline 1203 of the vehicle body passing through the center of the vehicle body is inclined by the angle θ (the inclined angle θ of the under cowl 1037 described above) with respect to a vertical line 1201 toward the left (or the right), that is, the bank angle can be increased with respect to the related art.

As described above in conjunction with FIG. 16, FIG. 23, and FIG. 26, firstly, the present invention is, in the motorcycle 1010 comprising the head pipe 1012, the pair of left and right down tubes 1084, 1084 extending downwardly and obliquely rearwardly from the head pipe 1012, and the pair of left and right lower pipes 1086, 1086 extending downwardly and rearwardly from the respective lower ends of the down tubes 1084, 1084. The large bank angle θ is secured by covering the lower portions of the engine 1018 and the exhaust pipe 1034 connected to the engine 1018 with the under cowl 1037 having the left and right inclined planes 1037b, 1037b formed so as to open upwardly, and forming the continuous inclined planes 1086A, 1086A on the left and right lower pipes 1086, 1086 so as to continue from the inclined planes 1037b, 1037b.

The bank angle θ can be increased in comparison with the related art, and the required bank angle θ can be secured easily by forming the continuous inclined planes 1086A, 1086A continuing from the inclined planes 1037b, 1037b of the under cowl 1037, so that the turning capability of the motorcycle 1010 is improved.

Secondly, the present invention includes the portion of the engine 18 projecting sideward of the vehicle body, that is, the AC generator cover 1065, is provided with inclined planes 1065A extending in substantially the same direction as the inclined planes 1037b of the under cowl 1037, and the extensions 1037C of the continuous inclined planes 1086A of the lower pipes 1086 are substantially brought into line with the inclined planes 1065A of the engine 1018.

The bank angle θ can further be increased, and the required bank angle θ can be secured further easily.

Figure 27:
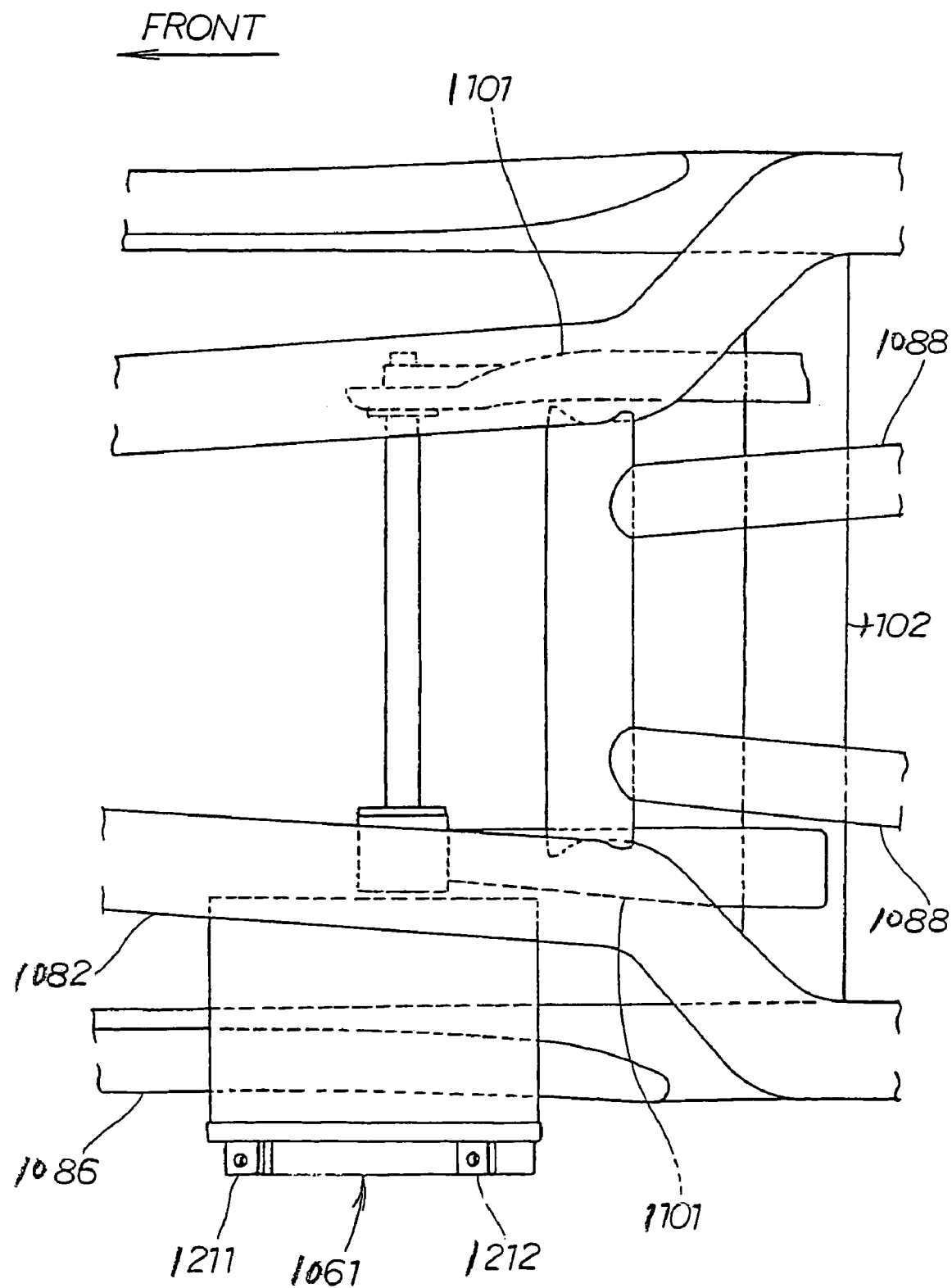
FIG. 27 is a plan view of a principal portion showing a position of a battery on the two-wheeler according to the present invention.
Figure 28:
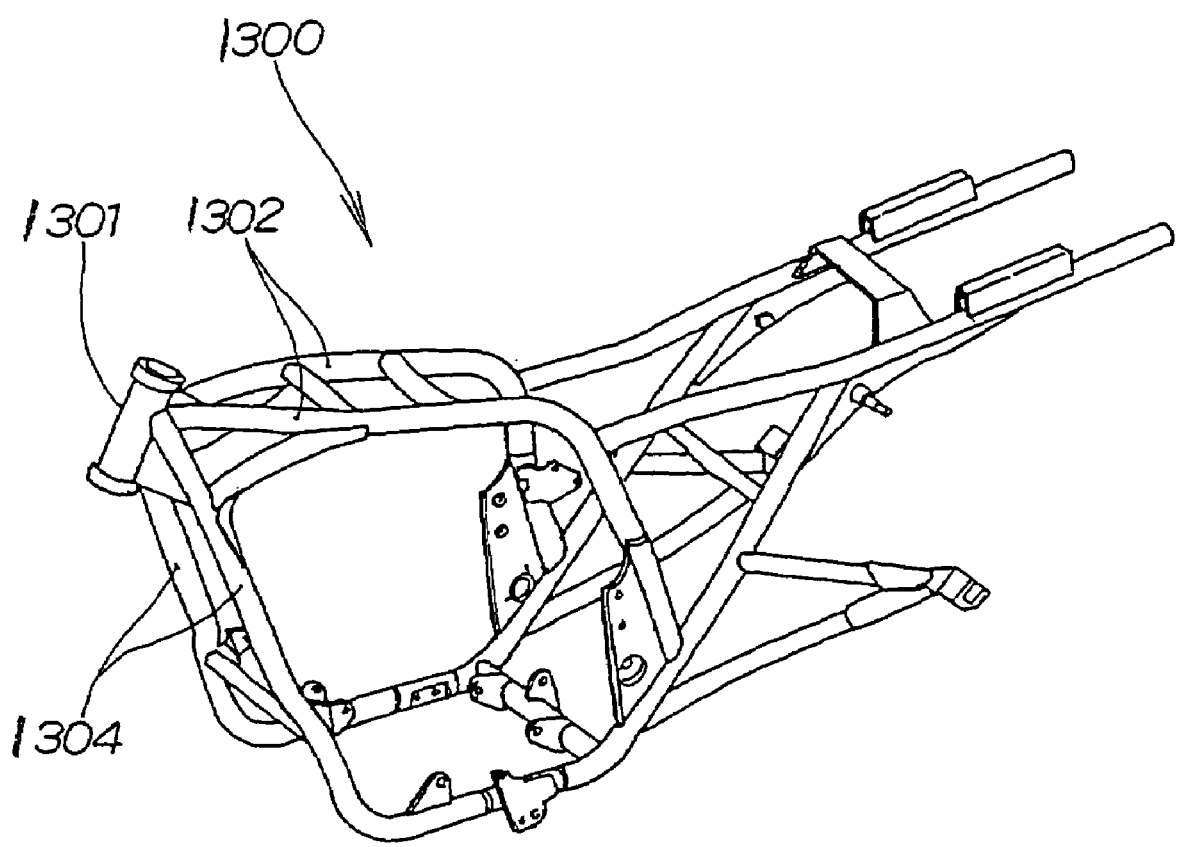
FIG. 28 is a perspective view showing a vehicle body frame structure of a two-wheeler in the related art.

FIG. 27 is a plan view of a principal portion showing the position of the battery on the two-wheeler according to the present invention, showing that the rear engine hangers 1101, 1101 are attached to the second cross pipe 1102, the battery 1061 is disposed on the side of engine hangers 1101, 1101 with respect to the vehicle body. More specifically, on the left side of the vehicle body so as to be close thereto. Electrode terminals 1211, 1212 of the battery 1061 are oriented sideward of the vehicle body so as to project sideward of the vehicle body in comparison with the main pipe 1082 and the lower pipe 1086.

Accordingly, maintenance such as attachment or detachment of the battery 1061, or attachment or detachment of wiring to the electrode terminals 1211, 1212 can be performed easily.

With the above described arrangement, the present invention demonstrates the following advantages.

In the vehicle body frame structure of the two-wheeler according to the present invention, since a large bank angle is secured by covering the lower portions of an engine and exhaust pipes connected to the engine with an under cowl having left and right inclined planes formed obliquely so as to open upward, and forming continuous inclined planes on left and right lower pipes so as to continue from the inclined planes, the bank angle can be increased in comparison with the related art, and the required bank angle can easily be secured.

In the vehicle body frame structure of the two wheeler according to the present invention, since the portion of the engine projecting sideward of the vehicle body is provided with inclined planes extending in substantially the same direction as the inclined planes of the under cowl, and extensions of the continuous inclined planes of the lower pipes are substantially brought into line with the inclined planes of the engine, the bank angle can further be increased, and the required bank angle can be secured further easily.

The invention being thus described, it will be obvious that the same may be varied in many ways. Such variations-are-not to be regarded as a departure from the spirit and scope of the invention, and all such modifications as would be obvious to one skilled in the art are intended to be included within the scope of the following claims.

What is claimed is:

1. In a two-wheeler comprising:
   an engine mounted to a vehicle body frame, the engine having exhaust pipes extending forwardly and downwardly; and
   a pair of left and right down tubes extending substantially downwardly from a head pipe provided at the front end of the vehicle body frame,
   a vehicle body frame structure of a two-wheeler includes the vehicle body frame having a cross member for connecting the left and right down tubes, and the cross member is formed with recesses for allowing part of the exhaust pipes to pass therethrough.

2. The vehicle body frame structure of a two-wheeler according to claim 1, wherein the engine is an in-line four-cylinder engine and the axes of the respective cylinders are oriented toward above the head pipe in side view.

3. The vehicle body frame structure of a two-wheeler according to claim 2, wherein a heat-discharging member, a radiator or an oil cooler, is disposed in front of the exhaust pipes, and the lower end of the heat-discharging member is disposed at the substantially same position as the cross member or downwardly of the cross member.

4. The vehicle body frame structure of a two-wheeler according to claim 3, wherein the heat-discharging member is formed into a substantially arcuate shape so as to project rearwardly of a vehicle, and the recesses are formed corresponding to the exhaust pipes of the cylinders located in a vicinity of the apex of the arcuate portion.

5. The vehicle body frame structure of a two-wheeler according to claim 3, wherein the cross member is a member having an engine hanger for supporting the engine.

6. The vehicle body frame structure of a two-wheeler according to claim 2, wherein the recesses are formed on the front side of the cross member.

7. The vehicle body frame structure of a two-wheeler according to claim 2, wherein the recesses are formed corresponding to the respective exhaust pipes provided on two of the cylinders, which are located on a central side.

8. The vehicle body frame structure of a two-wheeler according to claim 2, wherein in that the cross member is a member having an engine hanger for supporting the engine.

9. The vehicle body frame structure of a two-wheeler according to claim 1, wherein a heat-discharging member, a radiator or an oil cooler, is disposed in front of the exhaust pipes, and a lower end of the heat-discharging member is disposed at the substantially same position as the cross member or downwardly of the cross member.

10. The vehicle body frame structure of a two-wheeler according to claim 9, wherein the recesses are formed on the front side of the cross member.

11. The vehicle body frame structure of a two-wheeler according to claim 9, wherein the recesses are formed corresponding to the respective exhaust pipes provided on two of the cylinders, which are located on a central side.

12. The vehicle body frame structure of a two-wheeler according to claim 9, wherein the heat-discharging member is formed into a substantially arcuate shape so as to project rearwardly of a vehicle, and the recesses are formed corresponding to the exhaust pipes of the cylinders located in a vicinity of the apex of the arcuate portion.

13. The vehicle body frame structure of a two-wheeler according to claim 9, wherein that the cross member is a member having an engine hanger for supporting the engine.

14. The vehicle body frame structure of a two-wheeler according to claim 1, wherein the recesses are formed on the front side of the cross member.

15. The vehicle body frame structure of a two-wheeler according to claim 14, wherein the recesses are formed corresponding to the respective exhaust pipes provided on two of the cylinders, which are located on a central side.

16. The vehicle body frame structure of a two-wheeler according to claim 14, wherein the heat-discharging member is formed into a substantially arcuate shape so as to project rearwardly of a vehicle, and the recesses are formed corresponding to the exhaust pipes of the cylinders located in a vicinity of the apex of the arcuate portion.

17. The vehicle body frame structure of a two-wheeler according to claim 1, wherein the cross member is a member having an engine hanger for supporting the engine.

18. The vehicle body frame structure of a two-wheeler according to claim 1, wherein the cross member is disposed downwardly of a straight line passing through an axle of a front wheel, which is supported by a front fork steerably mounted to the head pipe and intersecting the down tubes.

19. The vehicle body frame structure of a two-wheeler according to claim 17, wherein the cross member is disposed downwardly of a straight line passing through an axle of a front wheel, which is supported by a front fork steerably mounted to the head pipe and intersecting the down tubes.

* * * * *